United States Patent
Morimoto

(10) Patent No.: US 12,061,479 B2
(45) Date of Patent: Aug. 13, 2024

(54) WATERCRAFT MANEUVERING CONTROL APPARATUS, AND WATERCRAFT MANEUVERING SYSTEM INCLUDING THE SAME

(71) Applicant: YAMAHA HATSUDOKI KABUSHIKI KAISHA, Iwata (JP)

(72) Inventor: Yuki Morimoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 289 days.

(21) Appl. No.: 17/696,399

(22) Filed: Mar. 16, 2022

(65) Prior Publication Data

US 2022/0299998 A1    Sep. 22, 2022

(30) Foreign Application Priority Data

Mar. 19, 2021  (JP) ................. 2021-046510

(51) Int. Cl.

| | |
|---|---|
| G05D 1/00 | (2024.01) |
| B63B 49/00 | (2006.01) |
| B63B 79/15 | (2020.01) |
| B63B 79/40 | (2020.01) |
| B63H 21/21 | (2006.01) |
| G06F 3/0484 | (2022.01) |

(52) U.S. Cl.
CPC .......... G05D 1/0206 (2013.01); B63B 49/00 (2013.01); B63B 79/15 (2020.01); B63B 79/40 (2020.01); B63H 21/21 (2013.01); G06F 3/0484 (2013.01); *B63H 2021/216* (2013.01)

(58) Field of Classification Search
None
See application file for complete search history.

(56) References Cited

U.S. PATENT DOCUMENTS

| | | | |
|---|---|---|---|
| 10,200,823 B2* | 2/2019 | Laster | H04W 4/40 |
| 11,151,884 B2* | 10/2021 | Solomon | G05D 1/0206 |
| 2015/0089427 A1 | 3/2015 | Akuzawa | |

FOREIGN PATENT DOCUMENTS

| | | |
|---|---|---|
| JP | 2015-066979 A | 4/2015 |
| JP | 2016-118705 A | 6/2016 |
| JP | 2016-177382 A | 10/2016 |

* cited by examiner

*Primary Examiner* — Todd Melton
(74) *Attorney, Agent, or Firm* — Keating & Bennett, LLP

(57) ABSTRACT

A watercraft maneuvering control apparatus for controlling a propulsion device of a watercraft in watercraft maneuvering modes includes a position detector to detect a position of the watercraft, a watercraft maneuvering mode selector operable by a user to select one of the watercraft maneuvering modes, a propulsion device controller configured or programmed to control the propulsion device in the selected watercraft maneuvering mode, a track display controller to generate track display data to display a track of the watercraft, and a display to display the watercraft track. The track display controller is configured or programmed to record track data, record watercraft maneuvering mode division information to divide the track data based on a watercraft maneuvering mode, and generate the track display data to display the watercraft track divided according to classification of the watercraft maneuvering modes.

12 Claims, 13 Drawing Sheets

FIG. 8A

| | COLOR | LINE TYPE | DISPLAY | NON-DISPLAY |
|---|---|---|---|---|
| Normal drive | BLACK | ——— | ☐ | ☑ |
| Heading Hold | RED | ━━━ | ☑ | ☐ |
| Course Hold | ORANGE | —·—·— | ☐ | ☑ |
| Track Point | BROWN | — — — | ☐ | ☑ |
| Pattern Steer | GREEN | — — — | ☑ | ☐ |
| Stay Point | YELLOW | ········ | ☐ | ☑ |
| Fish Point | PURPLE | - - - - | ☐ | ☑ |
| Drift Point | BLUE | — — — | ☑ | ☐ |

APPLY

FIG. 8B

| | DELETE | RETAIN |
|---|---|---|
| Normal drive | ☑ | ☐ |
| Heading Hold | ☐ | ☑ |
| Course Hold | ☑ | ☐ |
| Track Point | ☑ | ☐ |
| Pattern Steer | ☐ | ☑ |
| Stay Point | ☑ | ☐ |
| Fish Point | ☑ | ☐ |
| Drift Point | ☐ | ☑ |

APPLY

FIG. 8C

141a — Heading Hold    Stay Point — 141e
141b — Course Hold     Fish Point — 141f
141c — Track Point     Drift Point — 141g
141d — Pattern Steer

WATERCRAFT MANEUVERING CONTROL APPARATUS, AND WATERCRAFT MANEUVERING SYSTEM INCLUDING THE SAME

CROSS REFERENCE TO RELATED APPLICATIONS

This application claims the benefit of priority to Japanese Patent Application No. 2021-46510 filed on Mar. 19, 2021. The entire contents of this application are hereby incorporated herein by reference.

BACKGROUND OF THE INVENTION

1. Field of the Invention

The present invention relates to a watercraft maneuvering control apparatus that controls a propulsion device of a watercraft, and to a watercraft maneuvering system including the same.

2. Description of the Related Art

JP 2016-118705A discloses a map output device which outputs the travel track of a water surface mobile body on a map. The map output device is adapted to acquire the number of times of traveling in a range (region) for each of the points of the travel track, and is capable of displaying the travel track with an attribute value (color or background) which varies depending upon the number of the traveling times.

SUMMARY OF THE INVENTION

The inventor of preferred embodiments of the present invention described and claimed in the present application conducted an extensive study and research regarding a watercraft maneuvering system, such as the one described above, and in doing so, discovered and first recognized new unique challenges and previously unrecognized possibilities for improvements as described in greater detail below.

As the number of the displayed travel tracks increases, it becomes more difficult to discriminate the individual travel tracks from each other. Therefore, if the travel tracks can be properly separated from each other and separately displayed, the travel tracks can be more easily identified on the display.

In order to overcome the previously unrecognized and unsolved challenges described above, a preferred embodiment of the present invention provides a watercraft maneuvering control apparatus for controlling a propulsion device of a watercraft in a plurality of watercraft maneuvering modes. The watercraft maneuvering control apparatus includes a position detector to detect a position of the watercraft, and a watercraft maneuvering mode selector operable by a user to select one of the watercraft maneuvering modes. The watercraft maneuvering control apparatus includes a propulsion device controller configured or programmed to control the propulsion device in the watercraft maneuvering mode selected by the watercraft maneuvering mode selector, and a track display controller to generate track display data to display the track of the watercraft. The watercraft maneuvering control apparatus includes a display to display the watercraft track based on the track display data generated by the track display controller. The track display controller is configured or programmed to function as a track data recorder to record track data by recording the watercraft position detected by the position detector in accordance with time. The track display controller is configured or programmed to function as a watercraft maneuvering mode division information recorder to record watercraft maneuvering mode division information to divide the track data based on a watercraft maneuvering mode. The track display controller is configured or programmed to function as a track display data generator to generate the track display data to display the watercraft track divided according to classification of the watercraft maneuvering modes based on the track data recorded by the track data recorder and the watercraft maneuvering mode division information recorded by the watercraft maneuvering mode division information recorder.

With this arrangement, the watercraft maneuvering control apparatus is able to control the propulsion device in the plurality of watercraft maneuvering modes so that the user is able to maneuver the watercraft in various ways. The watercraft maneuvering mode is selected by the watercraft maneuvering mode selector. In a preferred embodiment of the present invention, the watercraft maneuvering mode division information is recorded to divide the track data based on the watercraft maneuvering mode. Then, the watercraft track is displayed in a divided manner according to the classification of the watercraft maneuvering modes based on the track data and the watercraft maneuvering mode division information. Therefore, the user is able to detect the watercraft track divided according to the classification of the watercraft maneuvering modes. In addition, the user selects the watercraft maneuvering mode so that the watercraft track is displayed in a divided identifiable manner in association with the user's operation. Therefore, the user is able to detect the watercraft track divided in association with the user's memory. Thus, the watercraft track is conveniently displayed in a properly divided manner.

The watercraft maneuvering control apparatus controls the propulsion device so as to control at least one of the magnitude and the direction of the output of the propulsion device. More specifically, at least one of the magnitude of a propulsive force, the switching between a forward propulsive force and a reverse propulsive force, and the change in the direction of the propulsive force (the change in steering angle) may be controlled.

The watercraft maneuvering modes may include an automatic watercraft maneuvering system mode. The automatic watercraft maneuvering system mode may include at least one of a course holding watercraft maneuvering system mode and a position/azimuth holding watercraft maneuvering system mode. The course holding watercraft maneuvering system mode may be a mode which is selectable mainly when a forward propulsive force is generated. The course holding watercraft maneuvering system mode may include at least one selected from a bow holding mode in which the azimuth of the bow of the watercraft is maintained during forward traveling, a straight travel holding mode in which a straight course is maintained during forward traveling, a checkpoint following mode in which a course passing through predetermined checkpoints is followed, and a pattern traveling mode in which a predetermined course pattern is followed. The position/azimuth holding watercraft maneuvering system mode may be a mode which is selectable mainly when substantially neither the forward propulsive force nor the reverse propulsive force is generated. The position/azimuth holding watercraft maneuvering system mode may include at least one selected from a fixed point holding mode in which the position and the azimuth of the watercraft are maintained, a position holding mode in which the position of the watercraft is maintained but the azimuth of the watercraft is not maintained, and an azimuth holding mode in which the azimuth of the watercraft is maintained but the position of the watercraft is not maintained. The watercraft maneuvering modes may further include a mode in which the watercraft travels along a course passing through predetermined checkpoints while the azimuth of the watercraft is maintained. The watercraft maneuvering modes may further include an ordinary watercraft maneuvering mode (main operation system mode) which is a manual watercraft maneuvering mode in which a main operation system such as a steering wheel is operated. The watercraft maneuvering modes may include an auxiliary operation system mode in which an auxiliary operation system such as a joystick is used to assist in maneuvering the watercraft.

The watercraft maneuvering modes to be used to display the watercraft track may be classified into the individual watercraft maneuvering modes. That is, the track display data generator may generate the track display data to display the watercraft track divided based on the watercraft maneuvering mode.

The watercraft maneuvering modes to be used for the divided display of the watercraft track may be classified into the ordinary watercraft maneuvering mode, the course holding watercraft maneuvering system mode, and the position/azimuth holding watercraft maneuvering system mode which are broader categories than the individual watercraft maneuvering modes.

In a preferred embodiment of the present invention, the watercraft maneuvering mode division information recorder includes a mode section information recorder to record section information for the selected watercraft maneuvering mode as the watercraft maneuvering mode division information according to the selection of the watercraft maneuvering mode by the watercraft maneuvering mode selector.

With this arrangement, the watercraft maneuvering mode section information is recorded according to the selection of the watercraft maneuvering mode by the watercraft maneuvering mode selector operated by the user. A section of the watercraft track corresponding to the recorded section information is displayed in a display manner unique to the classification of the watercraft maneuvering mode. Thus, the watercraft track is displayed properly divided in association with the watercraft maneuvering mode selected by the user in an easily identifiable manner.

The section information may include position information of a start point and/or an end point of the section, or may include time information of a start time and/or an end time of the section. The position information of the section start point/end point is typically information indicating a position of the watercraft at which a watercraft maneuvering mode selecting operation or a watercraft maneuvering mode cancelling operation is performed. Similarly, the time information of the section start time/end time is typically information indicating a time at which the watercraft maneuvering mode selecting operation or the watercraft maneuvering mode cancelling operation is performed.

In the recording of the watercraft maneuvering mode division information, the section information is recorded as described above and, in addition, the track data may be classified and recorded based on the watercraft maneuvering mode. That is, the track data is classified based on the watercraft maneuvering mode and, as a result, the track data is divided based on the watercraft maneuvering mode. Therefore, the track display data is generated and divided according to the classification of the watercraft maneuvering modes.

In a preferred embodiment of the present invention, the track display data generator generates the track display data to display the watercraft track with a display attribute which varies according to the classification of the watercraft maneuvering modes. With this arrangement, the watercraft track is displayed with the display attribute which varies according to the classification of the watercraft maneuvering modes. Therefore, the watercraft track is displayed in a divided manner according to the classification of the watercraft maneuvering modes that is easily identifiable.

In a preferred embodiment of the present invention, the display attribute includes at least one of a display color and a display line type. With this arrangement, the watercraft track is displayed in a divided manner in different colors or in different line types according to the classification of the watercraft maneuvering modes that is easily identifiable.

In a preferred embodiment of the present invention, the watercraft maneuvering control apparatus further includes a display attribute setter operable by the user to set the display attribute based on the watercraft maneuvering mode. The track display data generator generates the track display data according to the display attribute set by the display attribute setter.

With this arrangement, the user is able to set the display attribute, and the watercraft track is displayed in a divided manner with different values of the display attribute thus set according to the classification of the watercraft maneuvering modes. Thus, the watercraft track is displayed in a divided manner that is more easily identifiable.

In a preferred embodiment of the present invention, the watercraft maneuvering control apparatus further includes a non-display watercraft maneuvering mode specifier to specify a non-display watercraft maneuvering mode for which the watercraft track is not to be displayed. The track display data generator generates track display data to allow display of the watercraft track for a watercraft maneuvering mode unspecified by the non-display watercraft maneuvering mode specifier, and does not allow display of the watercraft track for the non-display watercraft maneuvering mode specified by the non-display watercraft maneuvering mode specifier.

With this arrangement, the specific watercraft maneuvering mode is specified. Then, the watercraft track is put in a non-display state for the specified watercraft maneuvering mode, and is put in a display state for the unspecified watercraft maneuvering mode. Thus, the watercraft track is displayed in an easily identifiable manner.

When the non-display watercraft maneuvering mode is specified, the unspecified watercraft maneuvering mode is consequently regarded as a display watercraft maneuvering mode for which the watercraft track is to be displayed. Therefore, the selection of the non-display watercraft maneuvering mode is equivalent to the selection of the display watercraft maneuvering mode. Therefore, the following arrangement is equivalent to the above-described arrangement and included within the scope of the above-described preferred embodiment. That is, the watercraft maneuvering control apparatus further includes a display watercraft maneuvering mode specifier to specify a display watercraft maneuvering mode for which the watercraft track is to be displayed. The track display data generator generates track display data that does not allow display of the watercraft track for a watercraft maneuvering mode unspecified by the display watercraft maneuvering mode specifier, and allows display of the watercraft track for the display watercraft maneuvering mode specified by the display watercraft maneuvering mode specifier.

The non-display watercraft maneuvering mode and/or the display watercraft maneuvering mode may be specified based on the watercraft maneuvering mode, or may be specified based on watercraft maneuvering mode categories which are broader than the individual watercraft maneuvering modes.

In a preferred embodiment of the present invention, the watercraft maneuvering control apparatus further includes a deletion watercraft maneuvering mode specifier to specify a deletion watercraft maneuvering mode for which the track data is to be deleted. The track display controller is configured or programmed to further function as a track data editor to delete the track data for the deletion watercraft maneuvering mode specified by the deletion watercraft maneuvering mode specifier.

With this arrangement, the specific watercraft maneuvering mode is specified. Then, the track data is deleted for the specified watercraft maneuvering mode, and is consequently retained for the unspecified watercraft maneuvering mode. Therefore, only the watercraft track for the unspecified watercraft maneuvering mode is displayed. Thus, the watercraft track is displayed in an easily identifiable manner.

When the deletion watercraft maneuvering mode for which the track data is to be deleted is specified, the unspecified watercraft maneuvering mode is consequently regarded as a retention watercraft maneuvering mode for which the track data is not to be deleted (i.e., for which the track data is to be retained). Therefore, the selection of the deletion watercraft maneuvering mode for which the track data is to be deleted is equivalent to the selection of the retention watercraft maneuvering mode for which the track data is to be retained. Accordingly, the following arrangement is equivalent to the above-described arrangement and included within the scope of the above-described preferred embodiment. That is, the watercraft maneuvering control apparatus further includes a retention watercraft maneuvering mode specifier to specify a retention watercraft maneuvering mode for which the track data is to be retained. The track display controller is configured or programmed to function as a track data editor to retain the track data for the retention watercraft maneuvering mode specified by the retention watercraft maneuvering mode specifier, and delete the track data for the other watercraft maneuvering modes.

The deletion watercraft maneuvering mode and/or the retention watercraft maneuvering mode may be specified based on the watercraft maneuvering mode, or may be specified based on watercraft maneuvering mode categories which are broader than the individual watercraft maneuvering modes.

In a preferred embodiment of the present invention, the watercraft maneuvering control apparatus further includes a target course setter operable by the user to set a target course based on track data previously recorded by the track data recorder. The watercraft maneuvering modes include a course follow-up automatic watercraft maneuvering mode in which the propulsion device is controlled to follow the target course set by the target course setter.

With this arrangement, the user is able to set the target course by using the previous track data. In the course follow-up automatic watercraft maneuvering mode, the propulsion device is controlled so as to follow the target course thus set. Since the watercraft is automatically maneuvered by using the previous track data, the watercraft maneuvering control apparatus is highly convenient.

When the target course is set based on the previous track data, the previous track data may be used as it is to set the target course, or the target course may be set, with reference to the previous track data, as having track data different from the previous track data (for example, by additionally setting a plurality of checkpoints).

In a preferred embodiment of the present invention, the target course setter includes a watercraft track section specifier operable by the user to specify a section of the previous watercraft track on the display according to the division based on the watercraft maneuvering mode division information recorded by the watercraft maneuvering mode division information recorder, and to set the target course based on the watercraft track section specified by the watercraft track section specifier.

With this arrangement, the section of the previous watercraft track is specified according to the division based on the watercraft maneuvering mode on the display, and the target course is set by utilizing the track data for the specified watercraft track section. Therefore, when the previous track data is used to set the target course, the previous track data is specified in a divided manner based on the watercraft maneuvering mode. Thus, the track data to be utilized to set the target course is easily specified such that the watercraft maneuvering control apparatus is still more convenient.

In a preferred embodiment of the present invention, the track display controller is configured or programmed to further function to export the track data and the watercraft maneuvering mode division information. In a preferred embodiment, the track display controller is configured or programmed to further function to import the track data and the watercraft maneuvering mode division information.

With this arrangement, the track data and the watercraft maneuvering mode division information is able to be used in another watercraft maneuvering control apparatus, or reused in different opportunities in the same watercraft maneuvering control apparatus. Further, the track data and the watercraft maneuvering mode division information is able to be used for different applications without the use of the watercraft maneuvering control apparatus. For example, specific track data and specific watercraft maneuvering mode division information may be shared to be analyzed by a plurality of users.

Another preferred embodiment of the present invention provides a watercraft maneuvering system including a propulsion device and a watercraft maneuvering control apparatus for controlling the propulsion device in a plurality of watercraft maneuvering modes. The watercraft maneuvering control apparatus includes the above-described features. With this arrangement, the watercraft maneuvering control apparatus is able to display the watercraft track in a divided manner so that the watercraft maneuvering system is highly convenient during the maneuvering thereof.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8A illustrates an exemplary display setting screen. FIG. 8B illustrates an exemplary track data editing screen. FIG. 8C illustrates an exemplary automatic watercraft maneuvering setting screen.

DETAILED DESCRIPTION OF THE PREFERRED EMBODIMENTS

Figure 1:
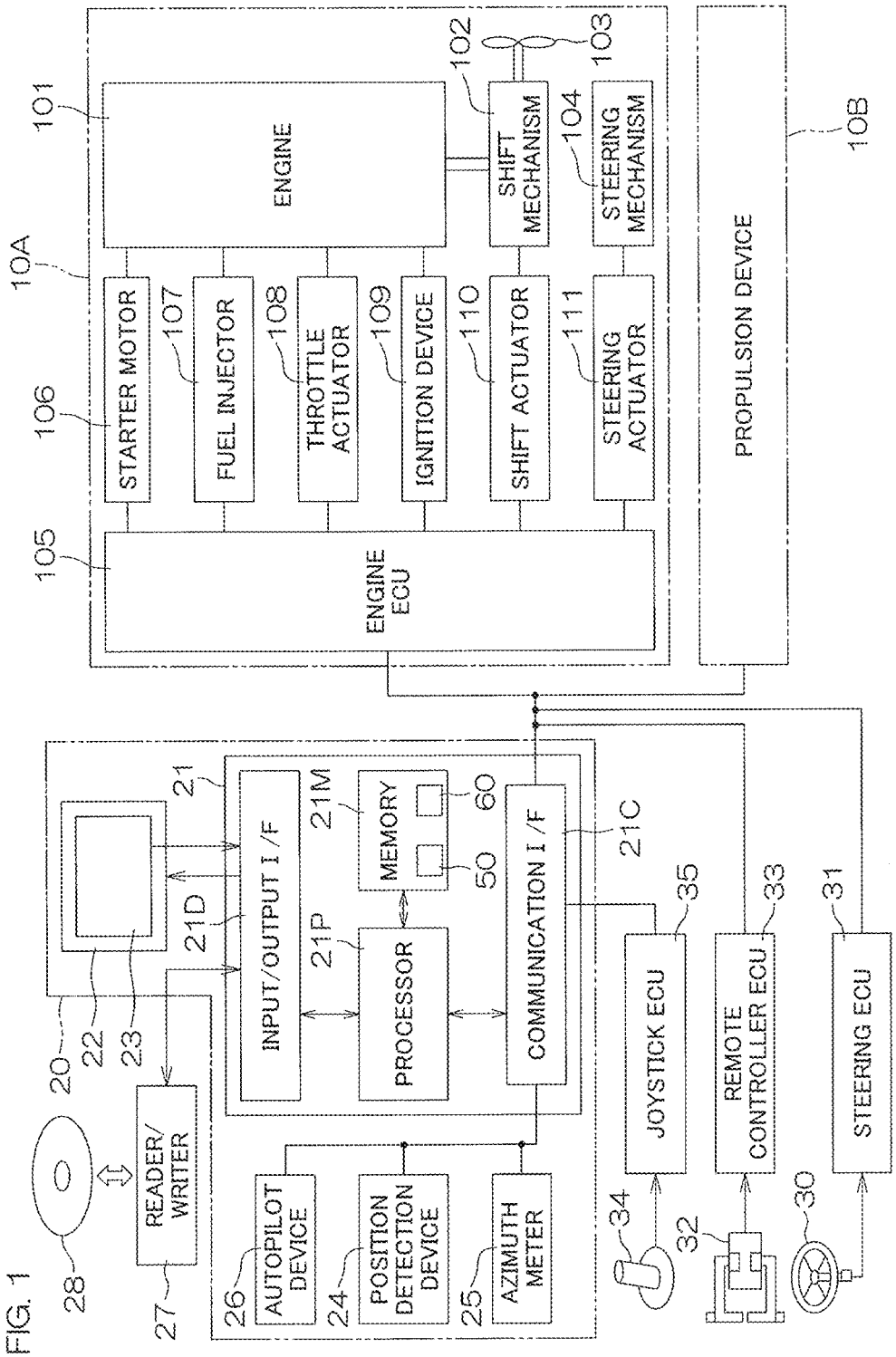
FIG. 1 is a block diagram for explaining the construction of a watercraft maneuvering system according to a preferred embodiment of the present invention.

FIG. 1 is a block diagram for explaining the construction of a watercraft maneuvering system according to a preferred embodiment of the present invention. The watercraft maneuvering system is provided and used in a watercraft. The watercraft may typically be a small watercraft called a pleasure boat.

The watercraft maneuvering system includes propulsion devices 10A, 10B (which are generally referred to as "propulsion device 10") and a watercraft maneuvering control apparatus 20. The watercraft maneuvering system further includes operation units 30, 32, 34 which are operated by a user to maneuver the watercraft.

In a preferred embodiment of the present invention, the propulsion device 10 includes a plurality of propulsion devices (more specifically, two propulsion devices). Of course, the propulsion device 10 may include a single propulsion device, or may include three or more propulsion devices. The propulsion device 10 may be an outboard motor provided on the stern of the watercraft, and the outboard motor may be an internal combustion engine outboard motor or an electric outboard motor. In FIG. 1, the engine outboard motor is shown by way of example. The propulsion device 10 provided in the form of engine outboard motor includes an engine 101, a shift mechanism 102, a propeller 103, a steering mechanism 104, and the like. A power generated by the engine 101 is transmitted to the propeller 103 via the shift mechanism 102. The steering mechanism 104 laterally changes the direction of a propulsive force generated by the propulsion device 10. In the case of the outboard motor, the outboard motor is laterally turned with respect to a hull of the watercraft. The shift mechanism 102 is configured so that the shift position thereof can be selected from a forward drive position, a reverse drive position, and a neutral position. When the shift position is the forward drive position, the rotation of the engine 101 is transmitted to the propeller 103 to rotate the propeller 103 in a normal or forward direction. When the shift position is the reverse drive position, the rotation of the engine 101 is transmitted to the propeller 103 to rotate the propeller 103 in a reverse direction. When the shift position is the neutral position, the transmission of the power between the engine 101 and the propeller 103 is prevented.

The propulsion device 10 further includes an engine ECU 105, a starter motor 106, a fuel injector 107, a throttle actuator 108, an ignition device 109, a shift actuator 110, a steering actuator 111, and the like. The engine ECU 105 controls the operations of the starter motor 106, the fuel injector 107, the throttle actuator 108, the ignition device 109, the shift actuator 110 and the steering actuator 111. The starter motor 106 is an electric motor which starts up the engine 101. The fuel injector 107 injects a fuel to be combusted in the engine 101. The throttle actuator 108 is an electric actuator (typically including an electric motor) which actuates a throttle valve of the engine 101. The ignition device 109 ignites an air-fuel mixture in a combustion chamber of the engine 101, and typically includes an ignition plug and an ignition coil. The shift actuator 110 actuates the shift mechanism 102. The steering actuator 111 is a drive source for the steering mechanism 104, and typically includes an electric motor. The steering actuator 111 may include a hydraulic device of an electric pump type.

The watercraft maneuvering control apparatus 20 includes a controller 21, a display device 22, a position detection device 24, an azimuth meter 25, and an autopilot device 26. The display device 22, the position detection device 24, and the autopilot device 26 are connected to the controller 21.

The display device 22 is typically a two-dimensional display device such as a liquid crystal display or an organic EL display. A touch panel 23 is provided on a display screen of the display device 22. An output signal of the touch panel 23 is inputted to the controller 21. The user operates the touch panel 23 to change the display screen of the display device 22, and operates buttons (software keys) displayed on the display screen to operate the various devices. In a preferred embodiment of the present invention, the touch panel 23 functions as a watercraft maneuvering mode selector to be operated by the user to select a watercraft maneuvering mode. Of course, a mode selecting switch different from the touch panel 23 may be provided, and may be connected to the controller 21.

A typical example of the position detection device 24 is a GNSS (Global Navigation Satellite System) receiver. The GNSS receiver receives radio waves from artificial satellites, and generates position data and moving speed data on earth. Of these, at least the position data is supplied to the controller 21. The azimuth meter 25 generates azimuth data indicating the azimuth of the watercraft, more specifically, the azimuth of the bow of the watercraft. The azimuth data is supplied to the controller 21. The autopilot device 26 automatically maneuvers the watercraft along a predetermined course. Here, the autopilot device 26 is provided separately from the controller 21 by way of example, but the function of the autopilot device 26 may be incorporated in the controller 21.

In a preferred embodiment of the present invention, the operation units 30, 32, 34 include a steering wheel 30, a remote control lever 32, and a joystick 34. A steering ECU (electronic control unit) 31, a remote control ECU 33, and a joystick ECU 35 are respectively provided in association with the steering wheel 30, the remote control lever 32, and the joystick 34. The steering ECU 31 and the remote control ECU 33 are connected to the controller 21 and the engine ECU 105 in a communicable manner, and the joystick ECU 35 is connected to the controller 21 in a communicable manner. However, the steering ECU 31 and the remote control ECU 33 may be connected to the engine ECU 105 via the controller 21 in a communicable manner.

The steering wheel 30 is operated by the user to set the traveling direction of the watercraft, i.e., to steer the watercraft. In a preferred embodiment of the present invention, the direction of the propulsive force generated by the propulsion device 10 is laterally changed according to the operation of the steering wheel 30 to steer the watercraft. The remote control lever 32 is operated by the user to set and/or adjust the shift position of the propulsion device 10 and the output of the propulsion device 10, i.e., the direction and the magnitude of the propulsive force generated by the propulsion device 10. In a preferred embodiment of the present invention, two remote control levers 32 are provided in association with the two propulsion devices 10. The joystick 34 is mainly used when a precise low-speed watercraft maneuvering is required, for example, when docking and undocking. For example, the joystick 34 is used to maneuver the watercraft so as to move the hull generally parallel in a direction corresponding to the tilt direction thereof with a propulsive force corresponding to the tilt amount thereof. The ECUs 31, 33, 35 are configured and programmed so as to generate signals according to the operation directions and operation amounts of the corresponding operation members, and input the signals to the controller 21.

The steering wheel 30 and the remote control lever 32 are exemplary main operation systems to be operated by the user in an ordinary watercraft maneuvering mode (main operation system mode) which is an ordinary manual watercraft maneuvering mode. The joystick 34 is an exemplary auxiliary operation system to be operated to assist the main operation systems. When the joystick 34 is used, the watercraft maneuvering mode of the controller 21 is a joystick mode (auxiliary operation system mode).

The controller 21 includes a processor (arithmetic unit) 21P, a memory 21M, a communication interface 21C, an input/output interface 21D, and the like. The controller 21 executes a program 50 stored in the memory 21M to define and function as various functional processing units. Further, various data is stored in the memory 21M. The stored data includes map data 60 to be displayed on the display device 22. The display device 22 and the touch panel 23 provided on the screen of the display device 22 are connected to the input/output interface 21D, and send and receive signals to/from the processor 21P via the input/output interface 21D. The steering ECU 31, the remote control ECU 33, and the joystick ECU 35 are connected to the communication interface 21C. Further, the engine ECU 105 of each of the propulsion devices 10A, 10B is connected to the communication interface 21C. The controller 21 communicates with the ECUs 31, 33, 35, 105 via the communication interface 21C for various arithmetic operations, processing operations, and control operations.

A reader/writer 27 may be connected to the controller 21. The reader/writer 27 removably receives a recording medium 28 and is able to read and write data from/to the recording medium 28. The reader/writer 27 may be connected to the processor 21P so as to send and receive data to/from the processor 21P via the input/output interface 21D. Examples of the recording medium 28 include portable recording media such as a USB memory, a memory card, and a recording disk.

Figure 2:
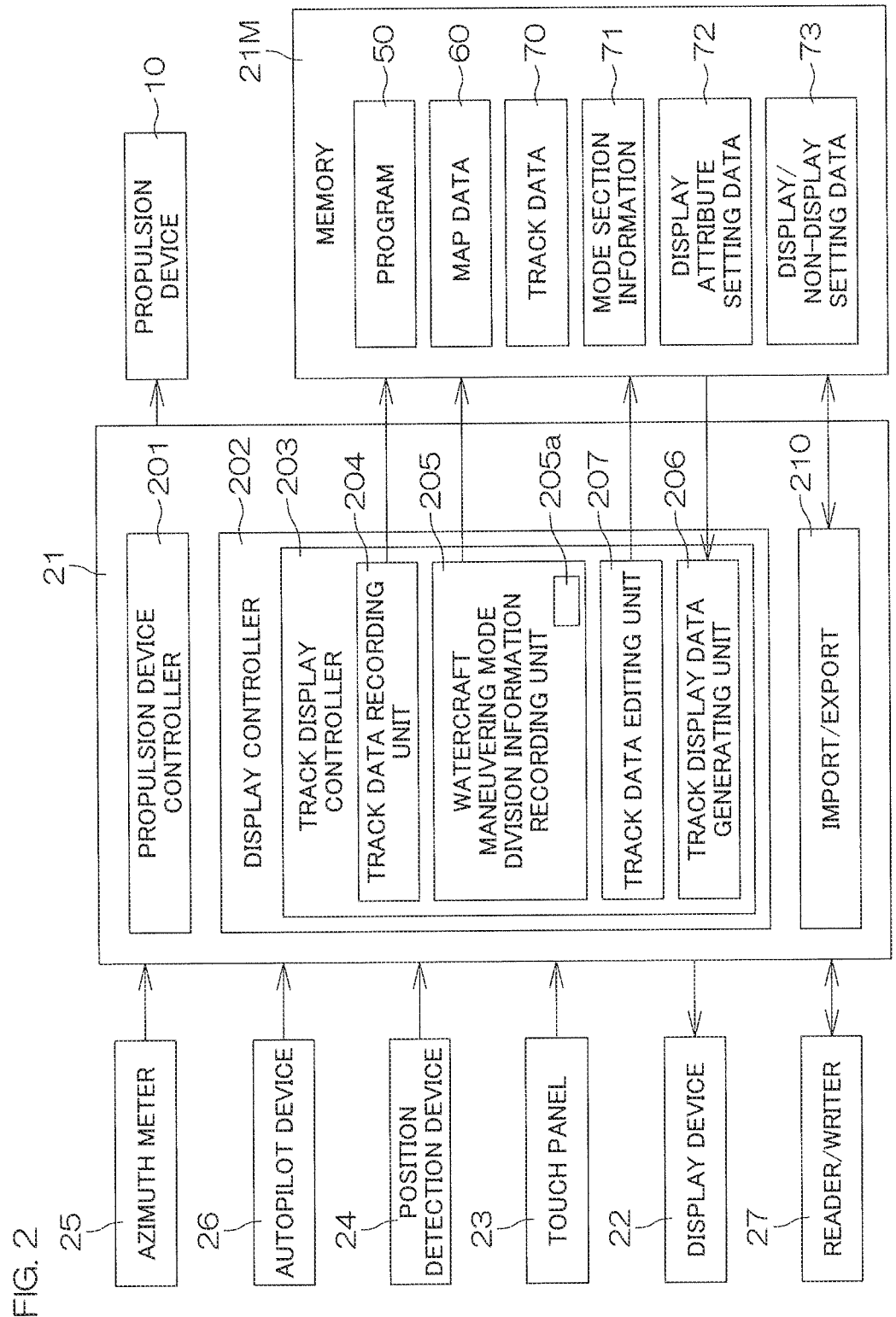
FIG. 2 is a block diagram for explaining the functional configuration of a controller provided in the watercraft maneuvering system.

FIG. 2 is a block diagram for explaining the functional configuration of the controller 21. As described above, the processor 21P executes the program 50 stored in the memory 21M such that the controller 21 defines and functions as various functional processing units. Examples of the functional processing units include a propulsion device controller 201 which controls the propulsion device 10, and a display controller 202 which controls the display by the display device 22.

The propulsion device controller 201 controls the propulsion device 10 in a watercraft maneuvering mode selected from a plurality of watercraft maneuvering modes. More specifically, the control of the propulsion device 10 includes the control of the output of the propulsion device 10 (the shift position and the magnitude of the propulsive force) and the control of the direction of the propulsive force (shift position control and steering control). For the selection of the watercraft maneuvering mode, for example, the user operates the touch panel 23. Therefore, the touch panel 23 is an example of the watercraft maneuvering mode selector. Alternatively, the joystick 34 may be operated to select the watercraft maneuvering mode. In this case, the joystick 34 is another example of the watercraft maneuvering mode selector. For example, the controller 21 may be configured or programmed so that the joystick watercraft maneuvering mode is selected by operating the joystick 34, and the ordinary watercraft maneuvering mode is selected by operating the remote control lever 32. In this case, the remote control lever 32 also functions as the watercraft maneuvering mode selector. The exemplary watercraft maneuvering modes will be described below in detail.

The display controller 202 functions to display various information required for the watercraft maneuvering on the display device 22, and to display operation screens including operation buttons to be operated by the touch panel 23 on the display device 22. Further, the display controller 202 functions as a track display controller 203 that generates track display data to display the track of the watercraft on the display device 22 and display the watercraft track on the display device 22. The track display controller 203 functions as a track data recording unit 204, a watercraft maneuvering mode division information recording unit 205, a track display data generating unit 206, a track data editing unit 207, and the like.

The track data recording unit 204 records track data 70 by recording the position of the watercraft detected by the position detection device 24 in accordance with time. The track data 70 is stored in the memory 21M. The watercraft maneuvering mode division information recording unit 205 records watercraft maneuvering mode division information to divide the track data 70 based on a watercraft maneuvering mode. In a preferred embodiment of the present invention, the watercraft maneuvering mode division information recording unit 205 includes a mode section information recording unit 205a which records, as the watercraft maneuvering mode division information, section information (mode section information 71) for the selected watercraft maneuvering mode in response to the selection of the watercraft maneuvering mode. The mode section information is information to divide the track data 70 recorded in accordance with time into track section data based on the watercraft maneuvering mode. Specifically, the mode section information may include information of a watercraft maneuvering mode selection start position and/or a watercraft maneuvering mode selection start time at which the selected watercraft maneuvering mode starts. Further, the mode section information may include a watercraft maneuvering mode selection end position and/or a watercraft maneuvering mode selection end time at which the selected watercraft maneuvering mode ends.

The track display data generating unit 206 generates track display data to display the watercraft track divided according to classification of the watercraft maneuvering modes based on the track data 70 and the mode section information 71. More specifically, the track display data generating unit 206 generates the track display data to display the watercraft track divided with different values of a display attribute according to the classification of the watercraft maneuvering modes. The values of the display attribute to be applied according to the classification of the watercraft maneuvering modes (e.g., based on the watercraft maneuvering mode) are preliminarily set, and stored as display attribute setting data 72 in the memory 21M. Specific examples of the display attribute include a display color and a display line type. The track display data generating unit 206 generates the track display data with one or both of a display color and a display line type which vary, for example, according to the classification of the watercraft maneuvering modes. The track display data is applied to the display device 22 such that the watercraft track is displayed in a divided manner with different values of the display attribute according to the classification of the watercraft maneuvering modes.

The display attribute values according to the classification of the watercraft maneuvering modes may be set, for example, by operating the touch panel 23. In this case, the display attribute setting data 72 thus set according to the classification of the watercraft maneuvering modes is stored in the memory 21M. The track display data generating unit 206 generates the track display data according to the display attribute setting data 72. In this example, the touch panel 23 is an example of the display attribute setter to be operated by the user in order to set the display attribute values according to the classification of the watercraft maneuvering modes.

The track display data generating unit 206 may function to generate track display data that allows display of the watercraft track for at least one of the watercraft maneuvering modes and does not allow display of the watercraft track for the other watercraft maneuvering modes. For example, a watercraft maneuvering mode for which the watercraft track is not to be displayed may be specified by operating the touch panel 23. In this case, the touch panel 23 is an example of the non-display watercraft maneuvering mode specifying device. The track display data generating unit 206 generates track display data that does not allow display of the watercraft track for a watercraft maneuvering mode specified as a non-display watercraft maneuvering mode, and allows display of the watercraft track for the other unspecified watercraft maneuvering modes. In contrast, a watercraft maneuvering mode for which the watercraft track is to be displayed may be specified by operating the touch panel 23. In this case, the touch panel 23 is an example of the display watercraft maneuvering mode specifying device. The track display data generating unit 206 generates track display data that allows display of the watercraft track for a watercraft maneuvering mode specified as a display watercraft maneuvering mode, and does not allow display of the watercraft track for the other unspecified watercraft maneuvering modes. When the non-display watercraft maneuvering mode is specified, the unspecified watercraft maneuvering modes are each regarded as the display watercraft maneuvering mode. In contrast, when the display watercraft maneuvering mode is specified, the unspecified watercraft maneuvering modes are each regarded as the non-display watercraft maneuvering mode. Therefore, the specification of the non-display watercraft maneuvering mode and the specification of the display watercraft maneuvering mode are substantially equivalent to each other, and have the same technical meaning.

In a preferred embodiment of the present invention, for example, the display/non-display of the watercraft track is set based on the watercraft maneuvering mode by operating the touch panel 23, and display/non-display setting data 73 indicating the display/non-display setting is stored in the memory 21M. According to the display/non-display setting data 73, the track display data generating unit 206 generates track display data that allows display of the watercraft track for the watercraft maneuvering mode specified as the display watercraft maneuvering mode, and does not allow display of the watercraft track for the watercraft maneuvering mode specified as the non-display watercraft maneuvering mode, and inputs the generated track display data in the display device 22.

The track data editing unit 207 functions to delete track data 70 for at least one of the watercraft maneuvering modes from the memory 21M. For example, the watercraft maneuvering mode for which the track data 70 is to be deleted may be specified by operating the touch panel 23. In this case, the touch panel 23 is an example of the deletion watercraft maneuvering mode specifying device. The track data editing unit 207 deletes the track data 70 for a watercraft maneuvering mode specified as a deletion watercraft maneuvering mode from the memory 21M, and retains the track data 70 for the other unspecified watercraft maneuvering modes in the memory 21M. In contrast, a watercraft maneuvering mode for which the track data 70 is to be retained may be specified by operating the touch panel 23. In this case, the touch panel 23 is an example of the retention watercraft maneuvering mode specifying device. The track data editing unit 207 retains the track data 70 for a watercraft maneuvering mode specified as a retention watercraft maneuvering mode in the memory 21M, and deletes the track data 70 for the other unspecified watercraft maneuvering modes in the memory 21M. When the deletion watercraft maneuvering mode is specified, the track data 70 for the unspecified watercraft maneuvering modes are retained in the memory 21M. In contrast, when the retention watercraft maneuvering mode is specified, the unspecified watercraft maneuvering modes are each regarded as the deletion watercraft maneuvering mode for which the track data 70 is to be deleted. Therefore, the specification of the deletion watercraft maneuvering mode and the specification of the retention watercraft maneuvering mode are substantially equivalent to each other, and have the same technical meaning.

The controller 21 may have an import/export function 210 to import and export various data via the reader/writer 27. With the recording medium 28 inserted in the reader/writer 27, for example, the track data 70 and the mode section information 71 stored in the memory 21M may be exported onto the recording medium 28. Further, a recording medium 28 in which track data and mode section information are recorded may be inserted in the reader/writer 27, and the data and/or the information may be imported from the recording medium 28 to the memory 21M.

Next, examples of the watercraft maneuvering modes will be described briefly.

The watercraft maneuvering modes include the ordinary watercraft maneuvering mode and the automatic watercraft maneuvering mode. The ordinary watercraft maneuvering mode is an ordinary manual watercraft maneuvering mode, which is a control mode in which the propulsion device 10 is steered according to the operation of the steering wheel 30, and the shift position and the output of the engine 101 are set according to the operation of the remote control lever 32. In the automatic watercraft maneuvering mode, the controller 21 intervenes in the steering control and the output control to achieve the target course, the target azimuth, or the target position of the watercraft.

The automatic watercraft maneuvering mode includes a course holding system mode, a position/azimuth holding system mode, and the joystick mode.

The course holding system mode is selectable when the shift position set by the remote control lever 32 is the forward drive position. Specifically, the course holding system mode may include at least one selected from a bow holding mode (Heading Hold) in which the bow azimuth is maintained during forward traveling, a straight travel holding mode (Course Hold) in which the bow azimuth is maintained and a straight course is maintained during forward traveling, a checkpoint following mode (Track Point) in which a course passing through predetermined checkpoints is followed, and a pattern traveling mode (Pattern Steer) in which a predetermined course pattern is followed. Examples of the course pattern to be followed in the pattern traveling mode include a zig-zag pattern and a spiral pattern.

The position/azimuth holding system mode is selectable when the shift position set by the remote control lever 32 is the neutral position. The position/azimuth holding system mode includes at least one selected from a fixed point holding mode (Stay Point) in which the watercraft position and the bow azimuth are maintained, a position holding mode (Fish Point) in which the watercraft position is maintained but the bow azimuth is not maintained, and an azimuth holding mode (Drift Point) in which the bow azimuth is maintained but the watercraft position is not maintained.

The joystick mode is a watercraft maneuvering mode which is selected when the joystick 34 is operated. In the joystick mode, the steering angle and the output of the propulsion device 10 are automatically controlled so that the watercraft is moved parallel or substantially parallel in a direction corresponding to the tilt direction of the joystick 34 with a propulsive force corresponding to the tilt amount of the joystick 34.

Figure 3:
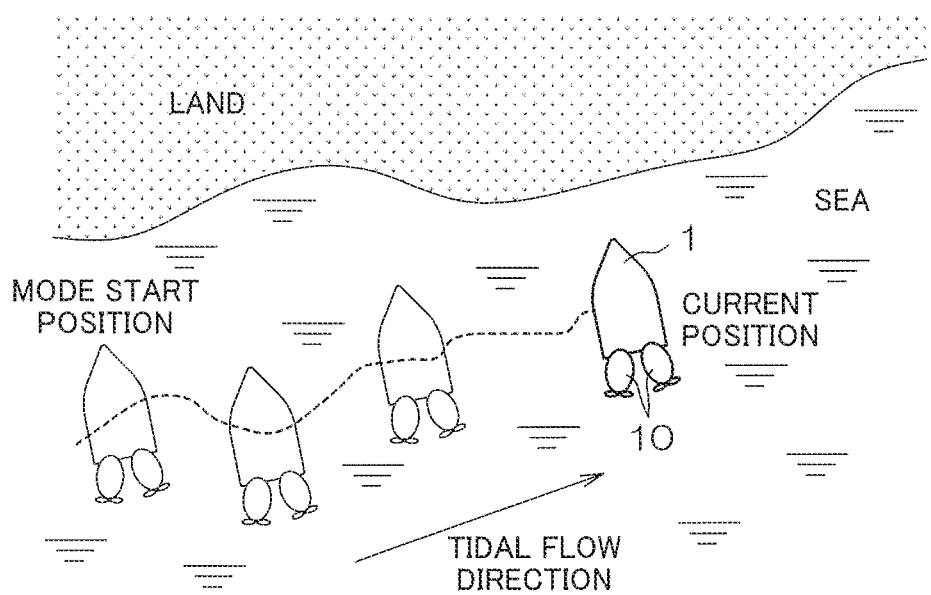
FIG. 3 schematically illustrates the behavior of a watercraft in an azimuth holding mode which is one of the watercraft maneuvering modes.

FIG. 3 schematically illustrates the behavior of the watercraft in the azimuth holding mode by way of example. The azimuth holding mode, which belongs to the position/azimuth holding system mode, is a watercraft maneuvering mode selectable when the shift position set by the remote control lever 32 is the neutral position. An output command and a steering command to maintain the current bow azimuth is applied from the controller 21 to the engine ECU 105. In response to the commands, the engine ECU 105 controls the shift actuator 110, the throttle actuator 108 and the like to control the output (propulsive force) of the propulsion device 10, and control the steering actuator 111 to adjust the direction of the propulsive force. Thus, the watercraft maintains the bow azimuth, i.e., the attitude of the hull. When there is a water flow such as a tidal flow, the watercraft position is correspondingly changed, but the bow azimuth is maintained. The bow azimuth to be maintained is able to be changed by the user by operating the steering wheel 30.

Figure 4:
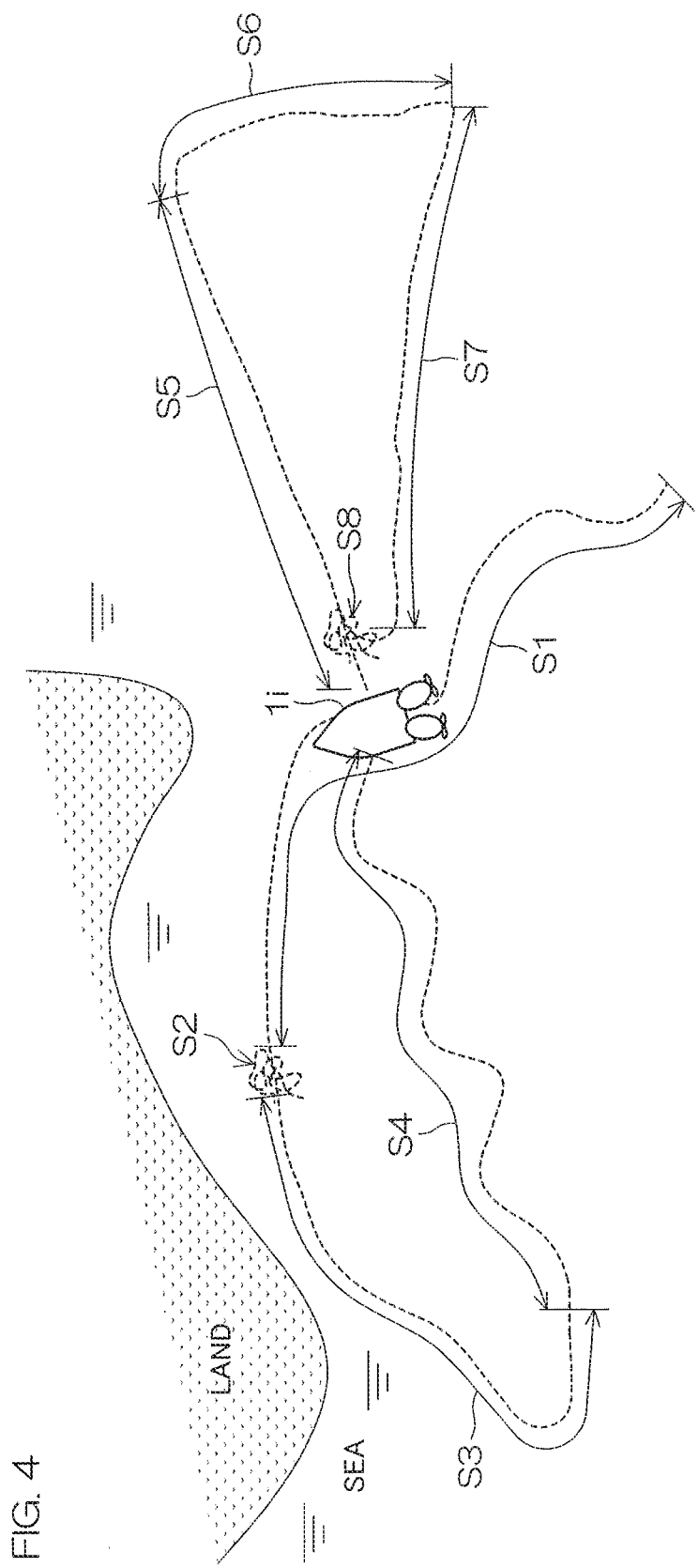
FIG. 4 illustrates how a watercraft track is displayed when the watercraft travels in various watercraft maneuvering modes on the sea by way of example (Comparative Example).

FIG. 4 illustrates how the watercraft track is displayed when the watercraft travels in various watercraft maneuvering modes on the sea by way of example (Comparative Example). A watercraft track portion S1 shows a section of the watercraft track in which the watercraft travels in the ordinary watercraft maneuvering mode. A watercraft track portion S2 shows a section of the watercraft track in which the watercraft is automatically maneuvered in the position holding mode. A watercraft track portion S3 shows a section of the watercraft track in which the watercraft travels again in the ordinary watercraft maneuvering mode. A watercraft track portion S4 shows a section of the watercraft track in which the watercraft is automatically maneuvered in the pattern traveling mode. In this example, the watercraft travels in the zig-zag pattern in the watercraft track portion S4. A watercraft track portion S5 shows a section of the watercraft track in which the watercraft is automatically maneuvered in the bow holding mode. A watercraft track portion S6 shows a section of the watercraft track in which the watercraft travels in the ordinary watercraft maneuvering mode. A watercraft track portion S7 shows a section of the watercraft track in which the watercraft is automatically maneuvered in the azimuth holding mode. A watercraft track portion S8 shows a section of the watercraft track in which the watercraft is automatically maneuvered in the fixed point holding mode.

An icon 1i of the watercraft indicates the current position of the watercraft. In this example, the icon 1i of the watercraft is located near an intersection of the watercraft track portions S1 and S4.

When the watercraft track shown in FIG. 4 is displayed on the display device 22, it is impossible for the user to automatically recognize the divisions of the watercraft track portions S1 to S8 and, therefore, the user has to guess the maneuvering modes for the respective watercraft track portions based on the shapes of the watercraft track sections and the user's memory. In reality, the watercraft track is much more complicated than the example shown in FIG. 4, and it is sometimes difficult to discriminate the watercraft track portions from each other. Where the current position of the watercraft overlaps the previous watercraft track as in the example of FIG. 4, it may be difficult to identify a watercraft track section even immediately before the current position of the watercraft is reached.

Figure 5A:
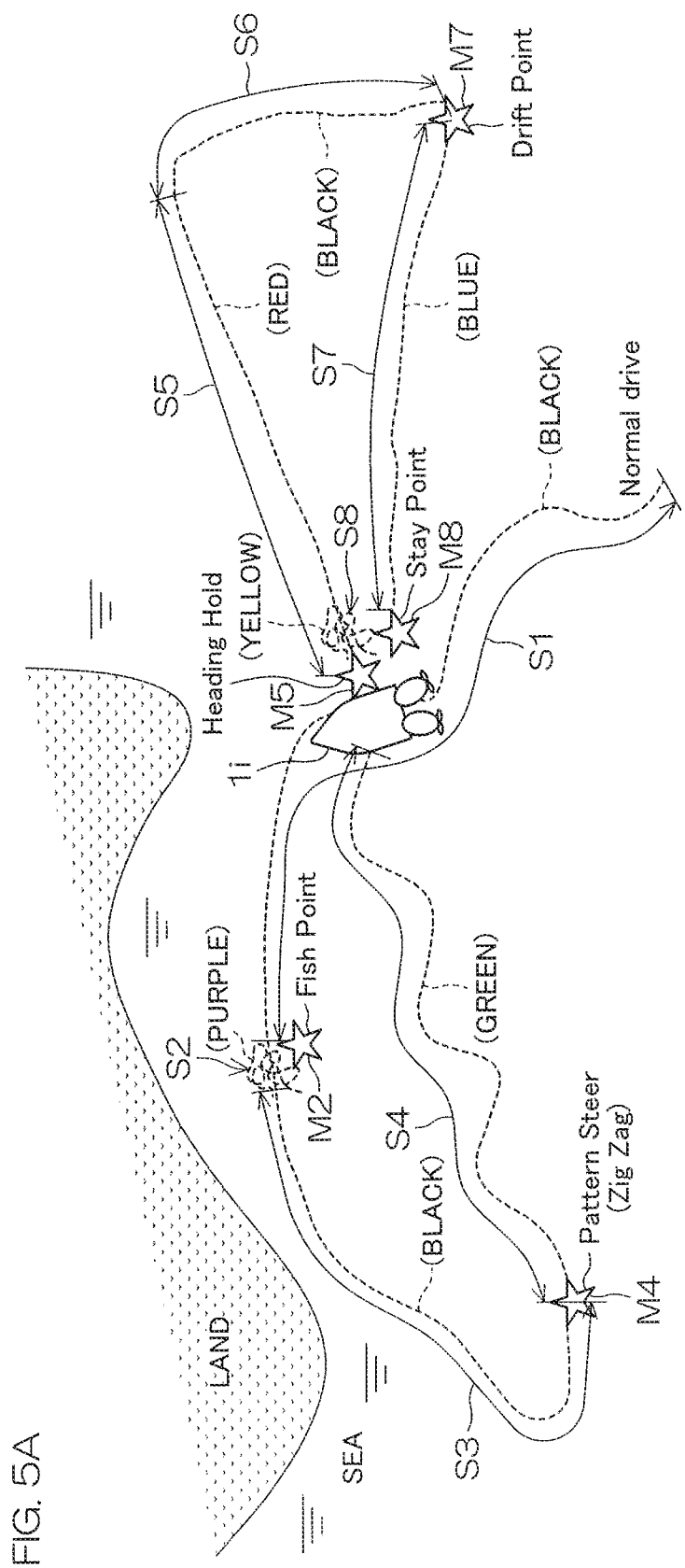
FIGS. 5A to 5C illustrate how a watercraft track is displayed in a divided manner based on a watercraft maneuvering mode by way of example (Inventive Example).

FIG. 5A illustrates an improved example (Inventive Example) of the watercraft track display. In this example, the respective watercraft track portions are displayed with different display attribute values according to the classification of the watercraft maneuvering modes (in this example, based on the watercraft maneuvering mode). Specifically, the respective watercraft track portions are displayed in different colors based on the watercraft maneuvering mode. More specifically, the watercraft track portions S1, S3, S6 for the ordinary watercraft maneuvering mode (Normal drive) are displayed in black. The watercraft track portion S2 for the position holding mode (Fish Point) is displayed in purple. The watercraft track portion S4 for the pattern traveling mode (Pattern Steer) is displayed in green. The watercraft track portion S5 for the bow holding mode (Heading Hold) is displayed in red. The watercraft track portion S7 for the azimuth holding mode (Drift Point) is displayed in blue. The watercraft track portion S8 for the fixed point holding mode (Stay Point) is displayed in yellow.

Figure 5B:
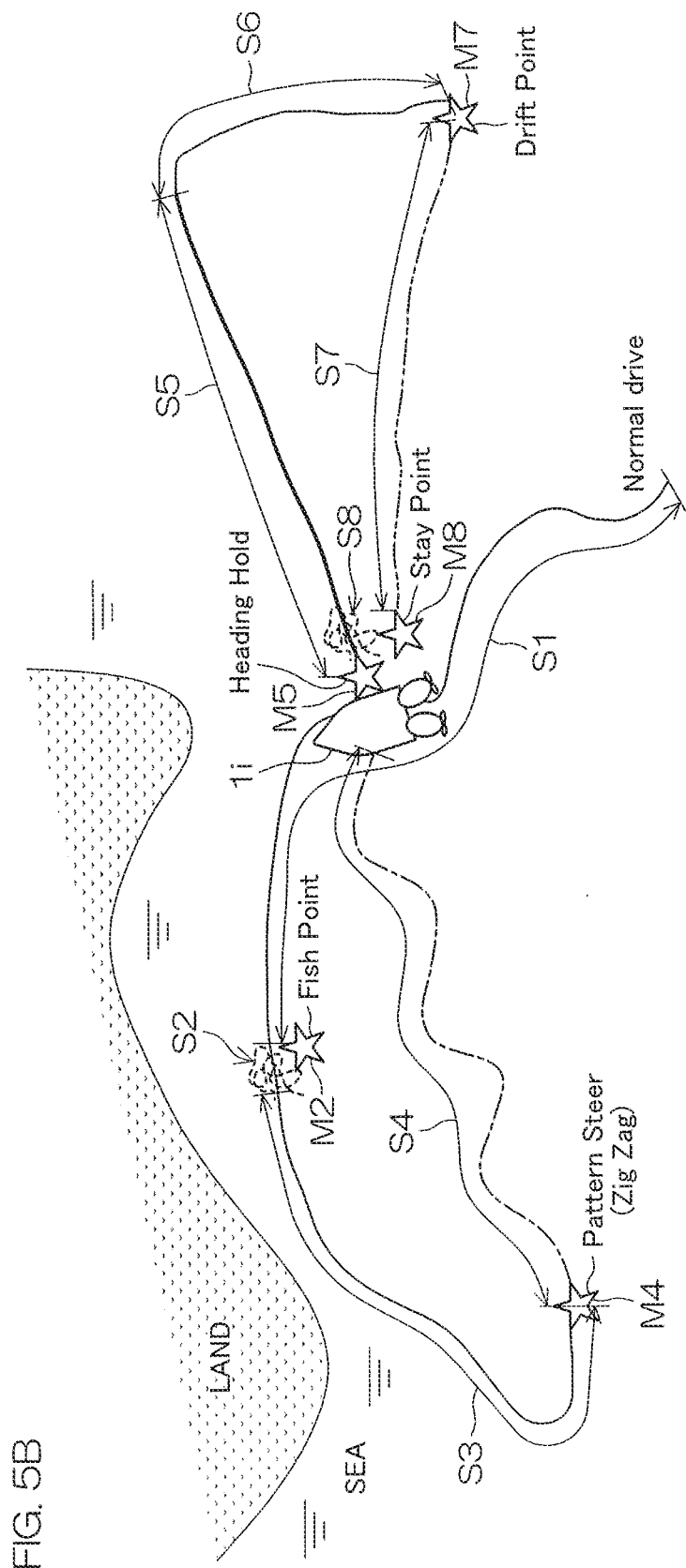

FIG. 5B illustrates another improved example (Inventive Example) of the watercraft track display. In this example, the respective watercraft track portions are displayed with different display attribute values according to the classification of the watercraft maneuvering modes (in this example, based on the watercraft maneuvering mode). Specifically, the respective watercraft track portions are displayed in different line types based on the watercraft maneuvering mode. More specifically, the watercraft track portions S1, S3, S6 for the ordinary watercraft maneuvering mode (Normal drive) are displayed in solid lines. The watercraft track portion S2 for the position holding mode (Fish Point) is displayed in a broken line. The watercraft track portion S4 for the pattern traveling mode (Pattern Steer) is displayed in a one-dot-and-dash line. The watercraft track portion S5 for the bow holding mode (Heading Hold) is displayed in a bold line. The watercraft track portion S7 for the azimuth holding mode (Drift Point) is displayed in a two-dot-and-dash line. The watercraft track portion S8 for the fixed point holding mode (Stay Point) is displayed in a dotted line.

Figure 5C:
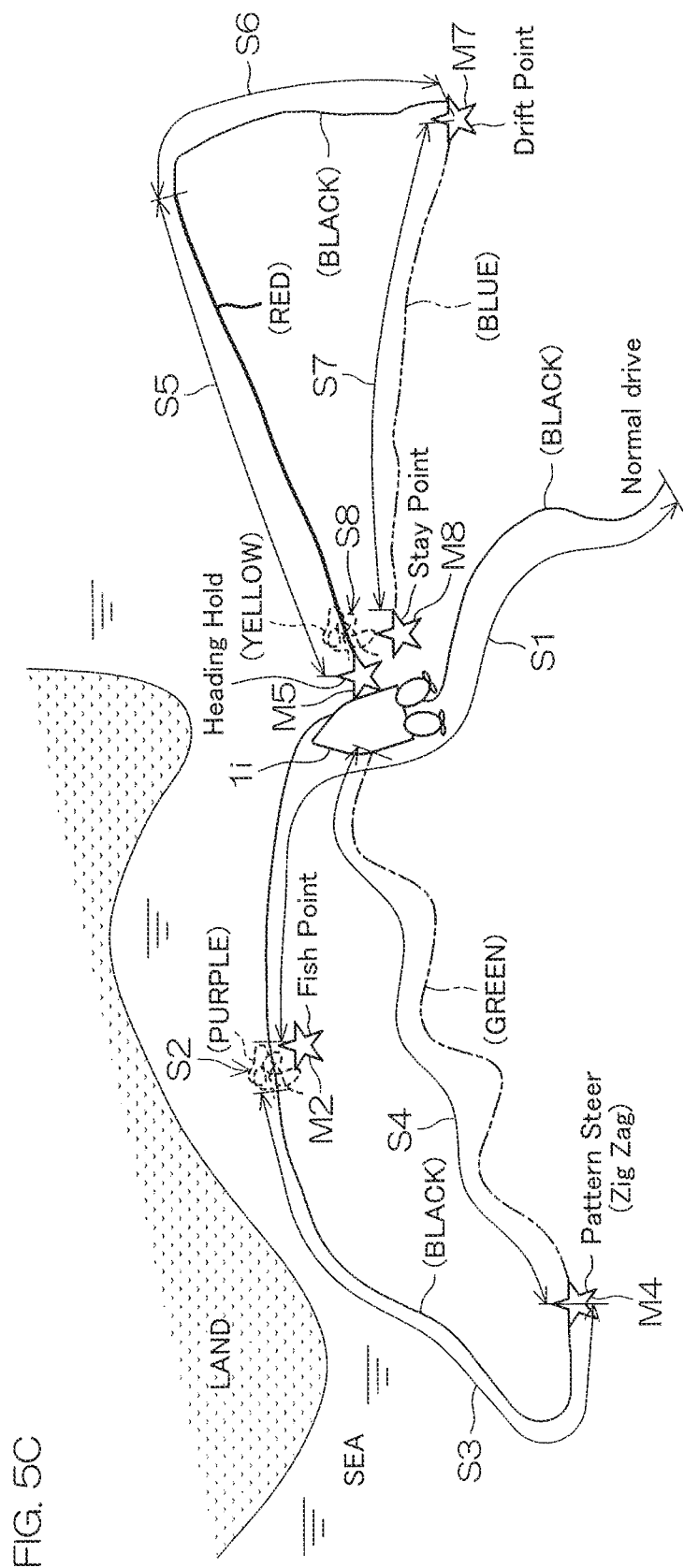

FIG. 5C illustrates further another improved example (Inventive Example) of the watercraft track display. In this example, the respective watercraft track portions are also displayed with different display attribute values according to the classification of the watercraft maneuvering modes (in this example, based on the watercraft maneuvering mode). Specifically, the respective watercraft track portions are displayed in different colors and different line types based on the watercraft maneuvering mode. More specifically, the watercraft track portions S1, S3, S6 for the ordinary watercraft maneuvering mode (Normal drive) are displayed in black solid lines. The watercraft track portion S2 for the position holding mode (Fish Point) is displayed in a purple broken line. The watercraft track portion S4 for the pattern traveling mode (Pattern Steer) is displayed in a green one-dot-and-dash line. The watercraft track portion S5 for the bow holding mode (Heading Hold) is displayed in a red bold line. The watercraft track portion S7 for the azimuth holding mode (Drift Point) is displayed in a blue two-dot-and-dash line. The watercraft track portion S8 for the fixed point holding mode (Stay Point) is displayed in a yellow dotted line.

In the above-described examples, the start points of the watercraft track portions for the watercraft maneuvering modes except for the ordinary watercraft maneuvering mode are respectively imparted with start point markers M2, M4, M5, M7, M8 (in these examples, star marks and the names of the watercraft maneuvering modes). Where the watercraft track is displayed divided in different colors based on the watercraft maneuvering mode (see FIGS. 5A and 5C), the display colors of the start point markers M2, M4, M5, M7, M8 may respectively match with the display colors of the watercraft track portions for the watercraft maneuvering modes. In this case, the watercraft track portions are more easily identifiable. Of course, the start points of the watercraft track portions for the ordinary watercraft maneuvering mode (at which the ordinary watercraft maneuvering mode is switched from different watercraft maneuvering modes) may each be displayed with a start point marker.

Figure 6:
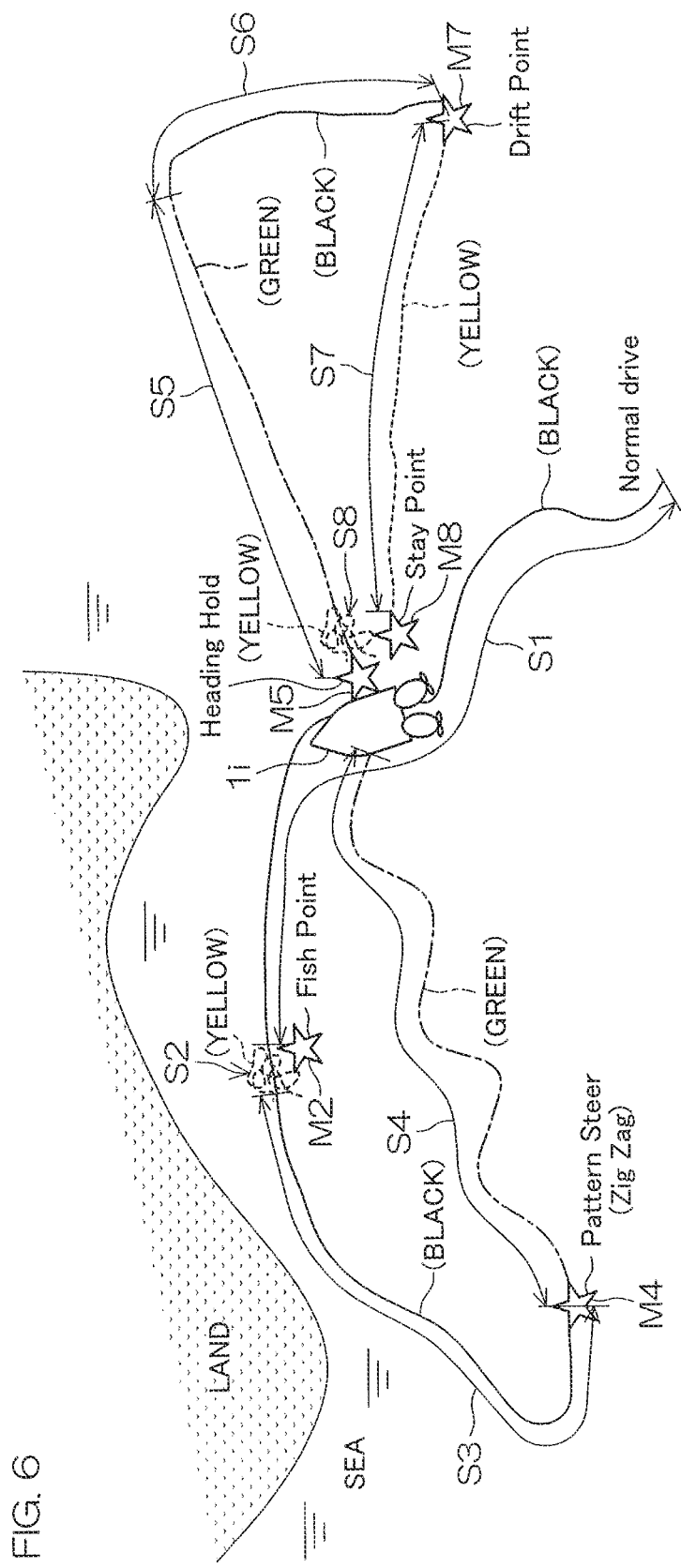
FIG. 6 illustrates how a watercraft track is displayed in a divided manner based on a watercraft maneuvering system mode by way of example (Inventive Example).

FIG. 6 illustrates how the watercraft track is displayed in a divided manner based on the watercraft maneuvering system mode by way of example (Inventive Example). In this example, the watercraft maneuvering modes are classified into broader categories than as shown in FIGS. 5A to 5C. Specifically, the watercraft maneuvering modes are classified into three modes, i.e., the ordinary watercraft maneuvering mode, the course holding system mode, and the position/azimuth holding system mode. According to this classification, the watercraft track portions S1, S3, S6 for the ordinary watercraft maneuvering mode (Normal drive) are displayed in black solid lines. The watercraft track portions S4, S5 for the pattern traveling mode (Pattern Steer) and the bow holding mode (Heading Hold) which belong to the course holding system mode are displayed in green one-dot-and-dash lines. The watercraft track portions S2, S7, S8 for the position holding mode (Fish Point), the azimuth holding mode (Drift Point) and the fixed point holding mode (Stay Point) which belong to the position/azimuth holding system mode are displayed in yellow broken lines.

In this example, both the display color and the display line type are used as the display attributes for the classification of the watercraft maneuvering modes. Alternatively, only the display color may be used as the display attribute as in the example shown in FIG. 5A, or only the display line type may be used as the display attribute as in the example shown in FIG. 5B. In any case, the start points of the respective watercraft track portions for the watercraft maneuvering modes are preferably imparted with the start point markers M2, M4, M5, M7, M8 (in these examples, star marks and the names of the watercraft maneuvering modes). When the watercraft track is displayed divided in different colors according to the classification of the watercraft maneuvering modes, the display colors of the start point markers M2, M4, M5, M7, M8 may respectively match with the display colors of the watercraft track portions for the watercraft maneuvering modes. In this case, the watercraft maneuvering modes are more easily identifiable. In FIG. 6, the start points of the watercraft track portions for the ordinary watercraft maneuvering mode are not imparted with the start point markers. Of course, the start points of the watercraft track portions for the ordinary watercraft maneuvering mode (at which the ordinary watercraft maneuvering mode is switched from different watercraft maneuvering modes) may each be displayed with a start point marker.

Figure 7:
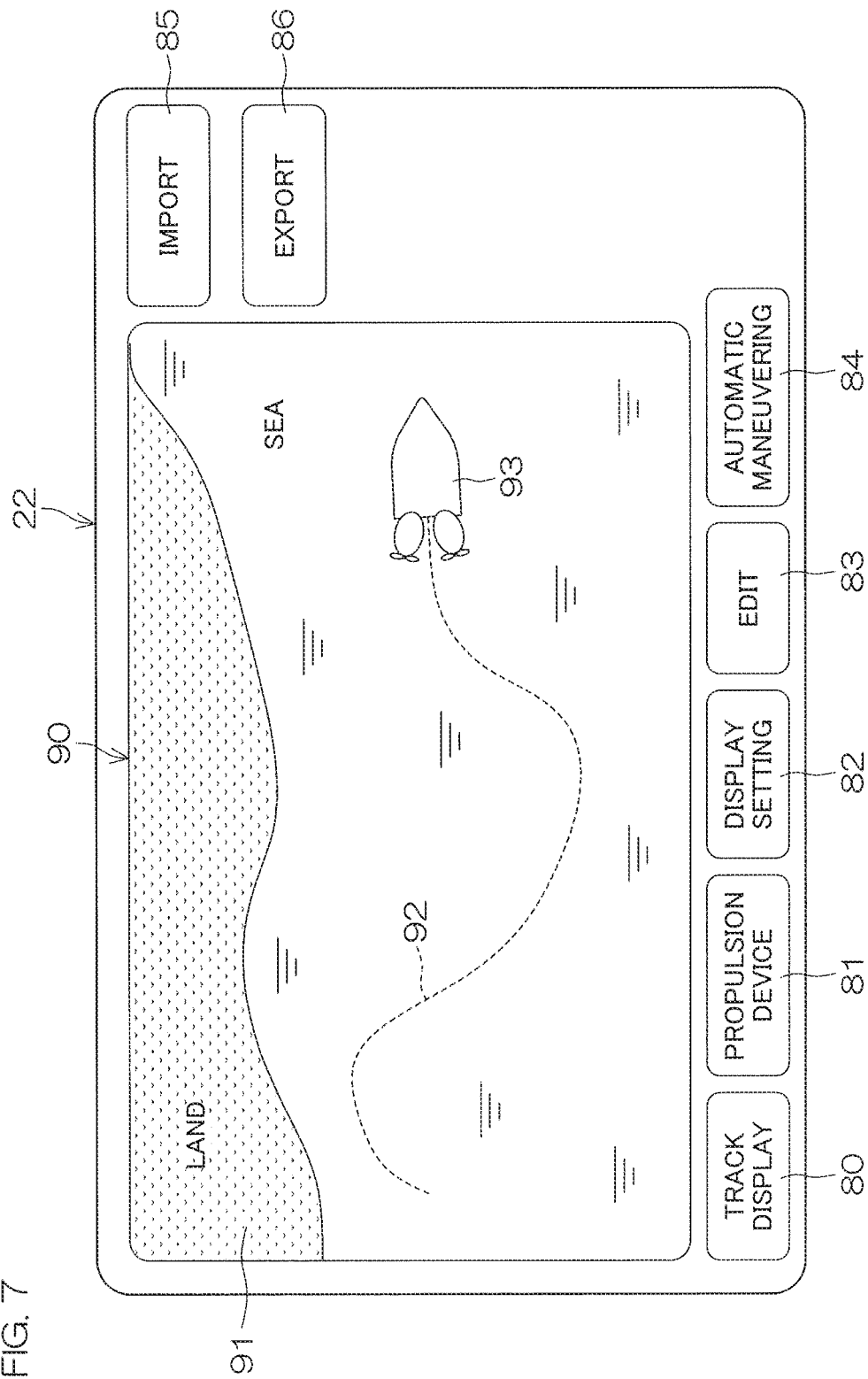
FIG. 7 illustrates an exemplary watercraft track display screen.

FIG. 7 shows the configuration of the display screen of the display device 22 by way of example. The display device 22 displays a display screen according to the display data sent from the controller 21. The controller 21 functions as the display controller 202 to generate the display data and send the display data to the display device 22. In this example, the display screen includes a watercraft track display button 80, a propulsion device button 81, a display setting button 82, an edit button 83, an automatic watercraft maneuvering setting button 84, an import button 85, and an export button 86. When the user touches any of these buttons, a corresponding operation signal is inputted to the controller 21 from the touch panel 23 provided on the surface of the display device 22.

The watercraft track display button 80 is an operation button to display a watercraft track display screen 90. In FIG. 7, the watercraft track display screen 90 is displayed on the display device 22. The watercraft track display screen 90 includes, for example, a map 91, a watercraft track 92 displayed on the map 91, and a watercraft icon 93 indicating the current position of the watercraft.

The propulsion device button 81 is an operation button to display information related to the propulsion device 10. When the propulsion device button 81 is operated, the controller 21 switches the display screen to a propulsion device information screen (not shown). Exemplary information to be displayed on the propulsion device information screen includes an engine rotation speed, a shift position, a remaining fuel amount, and an engine temperature.

Figure 9:
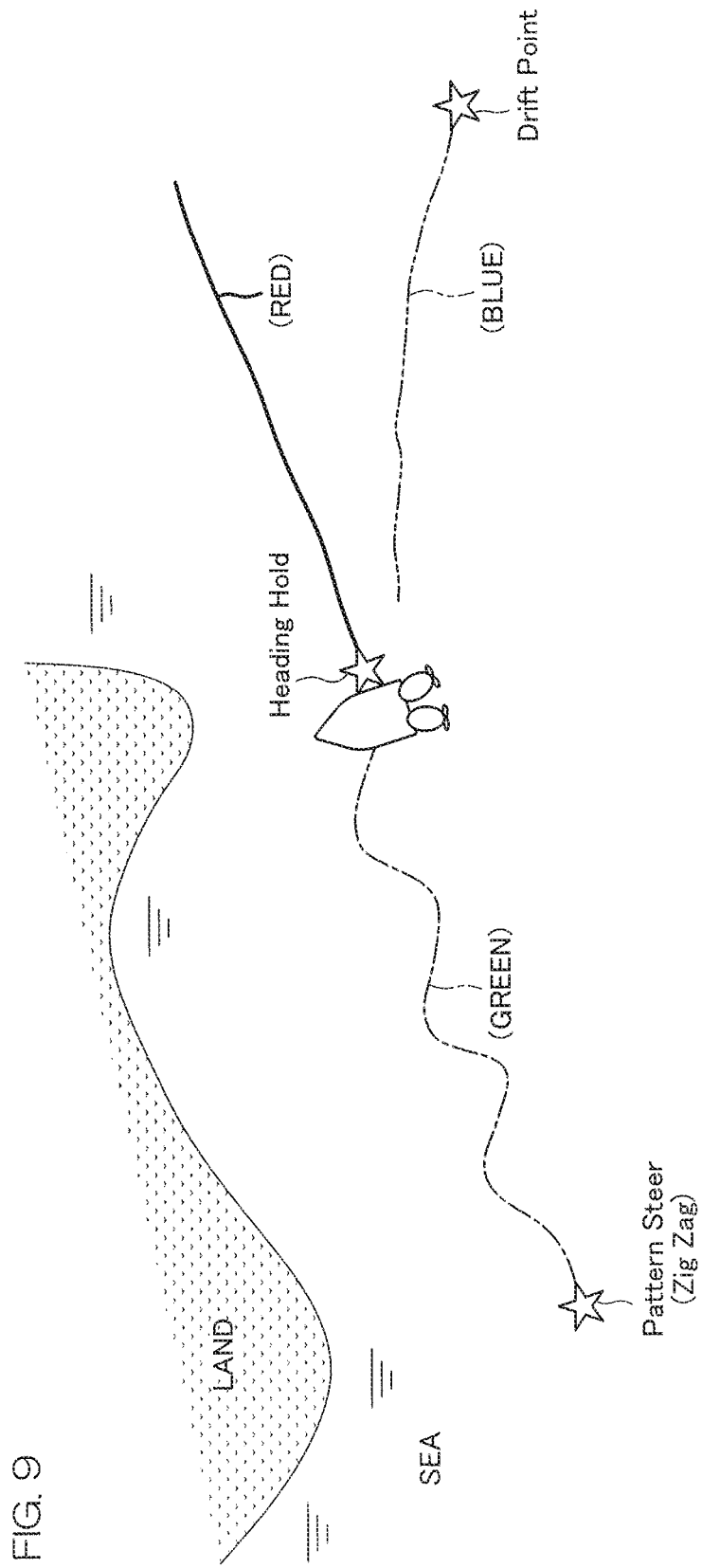
FIG. 9 illustrates an example of the watercraft track display screen in which only portions of the watercraft track for some of the watercraft maneuvering modes are displayed.

The display setting button 82 is an operation button to switch the display screen to a display setting screen 120 (see FIG. 8A) to set a watercraft track display attribute, and set a watercraft maneuvering mode (non-display watercraft maneuvering mode) for which the watercraft track is not to be displayed. Referring to FIG. 8A, the display setting screen 120 includes, for example, a display attribute setting portion 121 and a display/non-display setting portion 125. The display attribute setting portion 121 is operated to set watercraft track display attribute values for the respective watercraft maneuvering modes. The display attribute setting portion 121 includes, for example, one or both of a display color setting portion 122 and a display line type setting portion 123. The display color setting portion 122 is operated to set watercraft track display colors for the respective watercraft maneuvering modes. The display line type setting portion 123 is operated to set watercraft track display line types for the respective watercraft maneuvering modes. The display/non-display setting portion 125 is operated to set whether or not the watercraft track is to be displayed for the respective watercraft maneuvering modes. When an apply button 126 is operated after the setting is completed, the display setting screen 120 is switched to the watercraft track display screen 90, and the watercraft track is displayed for the watercraft maneuvering modes set as the display watercraft maneuvering modes according to the display attribute values thus set. FIG. 9 shows an exemplary watercraft track display screen displayed when the ordinary watercraft maneuvering mode (Normal drive), the straight travel holding mode (Course Hold), the checkpoint following mode (Track Point), the fixed point holding mode (Stay Point), and the position holding mode (Fish Point) are specified as the non-display watercraft maneuvering modes for which the watercraft track is not to be displayed, i.e., where the bow holding mode (Heading Hold), the pattern traveling mode (Pattern Steer), and the azimuth holding mode (Drift Point) are specified as the display watercraft maneuvering modes for which the watercraft track is to be displayed.

Referring back to FIG. 7, the edit button 83 is an operation button to switch the display screen to a track data editing screen 130 (see FIG. 8B) for editing the track data. Referring to FIG. 8B, the track data editing screen 130 includes, for example, a deletion/retention setting portion 131 to set the deletion/retention of the track data based on the watercraft maneuvering mode. When an apply button 132 is operated after the deletion/retention of the track data is set for the respective watercraft maneuvering modes by operating the deletion/retention setting portion 131, the track data for the watercraft maneuvering modes set as the deletion watercraft maneuvering modes is deleted from the memory 21M, and then the track data editing screen 130 is switched to the watercraft track display screen. In the watercraft track display screen, only the watercraft track corresponding to the track data for the watercraft maneuvering modes set as the retention watercraft maneuvering modes is displayed. An exemplary watercraft track display screen displayed when the ordinary watercraft maneuvering mode (Normal drive), the straight travel holding mode (Course Hold), the checkpoint following mode (Track Point), the fixed point holding mode (Stay Point), and the position holding mode (Fish Point) are specified as the deletion watercraft maneuvering modes for which the track data is to be deleted, i.e., where the bow holding mode (Heading Hold), the pattern traveling mode (Pattern Steer), and the azimuth holding mode (Drift Point) are specified as the retention watercraft maneuvering modes for which the track data is to be retained, is the same as in FIG. 9.

Referring again to FIG. 7, the automatic watercraft maneuvering setting button 84 is operated in order to switch the display screen to an automatic watercraft maneuvering setting screen 140 (see FIG. 8C) so as to set the automatic watercraft maneuvering mode. Referring to FIG. 8C, the automatic watercraft maneuvering setting screen 140 includes, for example, a plurality of mode select buttons 141 (141a to 141g) to select any of the watercraft maneuvering modes. The mode select buttons 141 include, for example, operation buttons 141a to 141d to select the watercraft maneuvering modes of the course holding system mode, i.e., the bow holding mode (Heading Hold), the straight travel holding mode (Course Hold), the checkpoint following mode (Track Point), and the pattern traveling mode (Pattern Steer), respectively. The mode select buttons 141 further include operation buttons 141e to 141g to select the watercraft maneuvering modes of the position/azimuth holding system mode, i.e., the fixed point holding mode (Stay Point), the position holding mode (Fish Point), and the azimuth holding mode (Drift Point), respectively. Basically, only one of the watercraft maneuvering modes is selected. However, one of the watercraft maneuvering modes of the course holding system mode and one of the watercraft maneuvering modes of the position/azimuth holding system mode, for example, may be simultaneously selected in combination. For example, it may be possible to simultaneously select the checkpoint following mode (Track Point) and the azimuth holding mode (Drift Point). In this case, the propulsion device 10 is controlled so that the watercraft travels along a course passing through checkpoints preliminarily set by the user with its bow azimuth maintained.

When the mode select button 141c is operated to select the checkpoint following mode (Track Point), the display screen is switched to a checkpoint setting screen.

Figure 10:
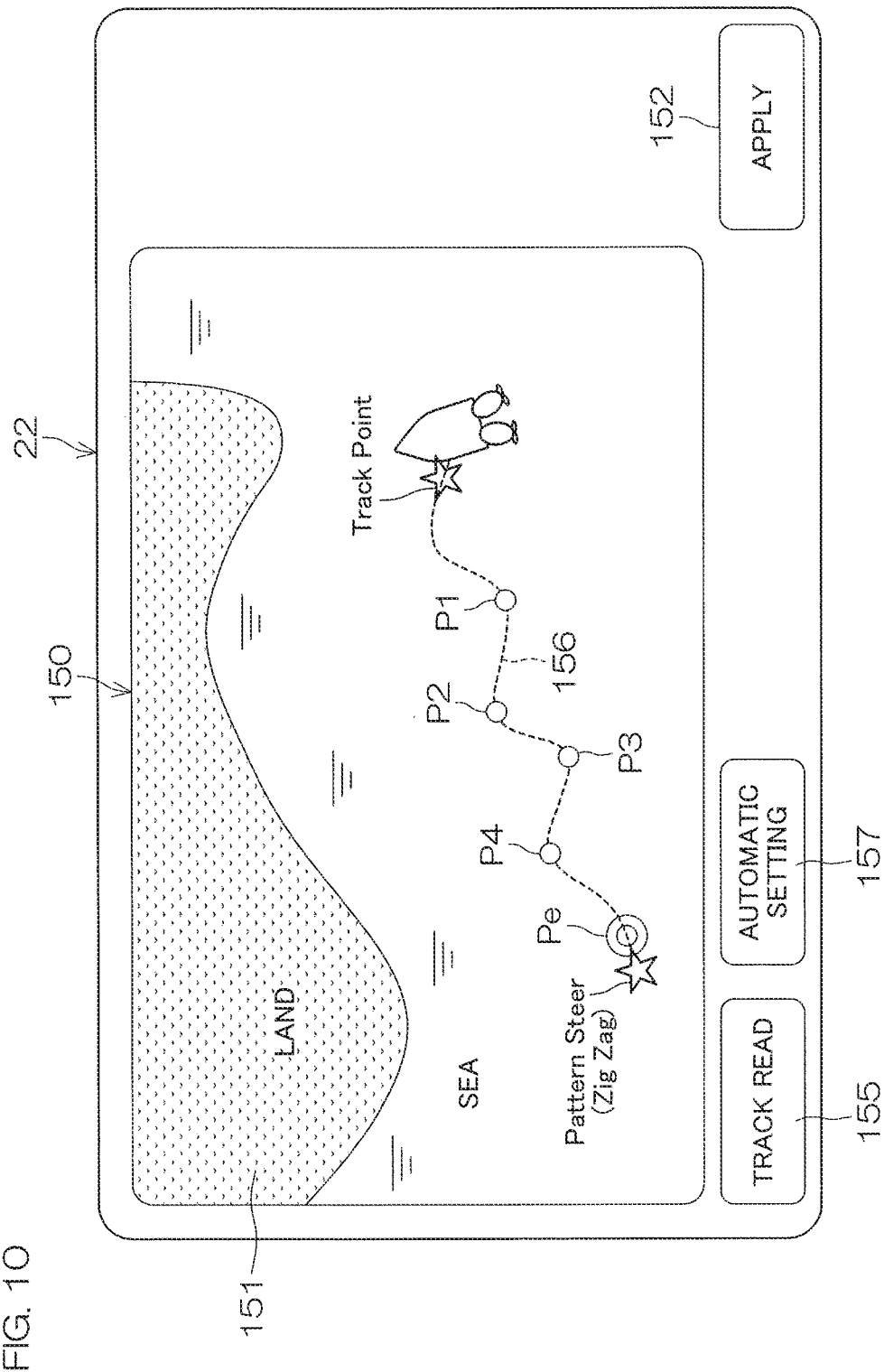
FIG. 10 illustrates an exemplary checkpoint setting screen (target course setting screen).

FIG. 10 illustrates a specific example of the checkpoint setting screen 150 (target course setting screen). The checkpoint setting screen 150 may include a sea map 151 displayed therein. The user operates the touch panel 23, for example, by touching the display screen at one or more positions on the displayed map 151 such that one or more checkpoints P1, P2, . . . and a final destination Pe can be set on the checkpoint setting screen. In this case, the touch panel 23 is an example of the target course setter to be operated by the user to set the target course (checkpoints). With reference to the map data 60, the controller 21 determines the position coordinates of the checkpoints P1, P2, . . . and the final destination Pe, and stores the position coordinates as checkpoint coordinates in the memory 21M. When an apply button 152 is operated, the watercraft maneuvering is automatically controlled based on the thus set checkpoint coordinates in the checkpoint following mode (Track Point). The checkpoint following mode is an example of the course follow-up automatic watercraft maneuvering mode.

The checkpoint setting screen may include a watercraft track read button 155 to read the previous track data. By operating the watercraft track read button 155, the previous watercraft track is read out to be displayed on the map 151. When the watercraft track read button 155 is operated, the controller 21 displays a watercraft track reference screen for reference to the previous track data on the display device 22. The watercraft track reference screen includes, for example, watercraft track display similar to the display examples shown in FIGS. 5A to 5C and FIG. 6. That is, the watercraft track is displayed in a divided manner in different display colors and/or different display line types based on the watercraft maneuvering mode or based on the watercraft maneuvering system mode. The user operates the touch panel 23 by touching the display screen to select any of the watercraft track portions S1 to S8 (watercraft track sections). Thus, the selected watercraft track portion is specified as a reference watercraft track to set a target course. In response to this specifying operation, the controller 21 retains the specified watercraft track portion as the reference watercraft track while deleting the other watercraft track portions. In this case, the touch panel 23 is an example of the watercraft track section specifying device to be operated by the user to specify the previous watercraft track section on the display device 22.

In FIG. 10, an exemplary reference watercraft track 156 is shown, which is displayed when the watercraft track portion S4 for the pattern traveling mode (Pattern Steer) is specified. With reference to the displayed reference watercraft track 156, the user is able to set the one or more checkpoints P1, P2, . . . and the final destination Pe on the map 151.

The checkpoint setting screen 150 may have an automatic setting button 157 to automatically set one or more checkpoints on the reference watercraft track 156 when the previous watercraft track is read out as the reference watercraft track 156. In this case, the automatic setting button 157 is operated such that the controller 21 automatically acquires the coordinates of one or more points on the displayed reference watercraft track 156 as the checkpoint coordinates. The checkpoints set by the operation of the automatic setting button 157 may be changeable through a dragging operation which is performed by touching the screen of the display device 22.

Thus, the target course (checkpoints) is able to be manually or automatically set by reusing a watercraft track for a certain watercraft maneuvering mode, and the watercraft is automatically maneuvered in the checkpoint following mode.

Figure 11:
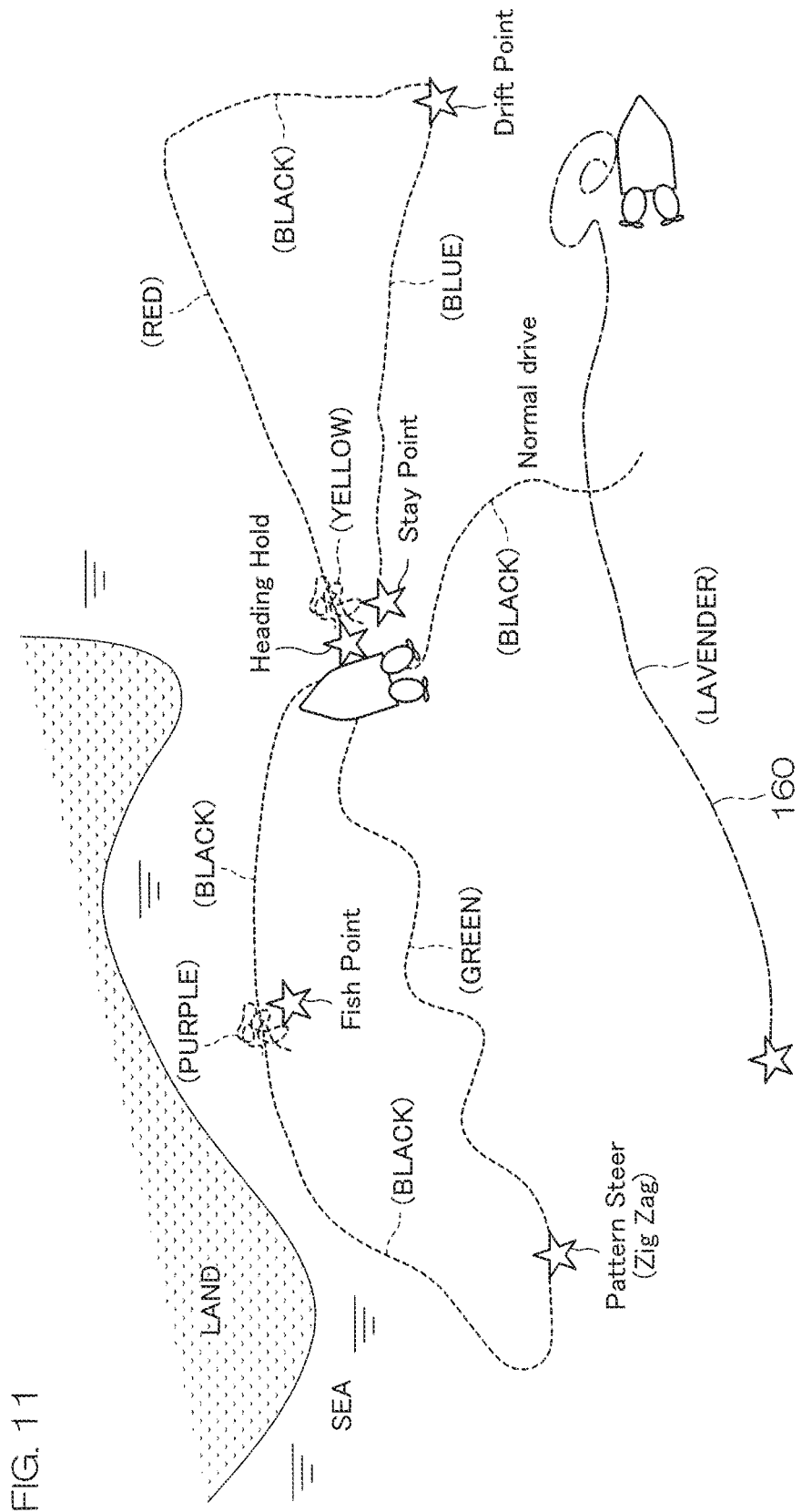
FIG. 11 is a diagram for explaining an import/export function.

FIG. 11 is a diagram for explaining functions to be performed by operating the import button 85 and the export button 86 (see FIG. 7). The export button 86 is operated such that the controller 21 reads out the track data 70 and the mode section information 71 from the memory 21M onto the recording medium 28 inserted in the reader/writer 27 (see FIG. 2). The data thus read out is utilized in a similar watercraft maneuvering system provided in a different watercraft. On the other hand, the import button 85 is operated such that track data and mode section information exported from another similar watercraft maneuvering system is read from a recording medium 28 via the reader/writer 27 for use. FIG. 11 shows a display example in which a watercraft track 160 imported from a different watercraft is displayed on the display device 22. With reference to the watercraft track 160, for example, the watercraft is able to travel along a course on which a good fishing result was achieved on the different watercraft. Of course, the watercraft can be automatically maneuvered in the checkpoint following mode based on checkpoints set by utilizing the watercraft track of the different watercraft (see FIG. 10).

In a preferred embodiment of the present invention, as described above, the watercraft maneuvering control apparatus 20 is able to control the propulsion device 10 in the plurality of watercraft maneuvering modes so that the user is able to maneuver the watercraft in various ways. The watercraft maneuvering mode is selected through the operation by the user. Specifically, the automatic watercraft maneuvering mode is selected by operating the touch panel 23. Further, the joystick mode is selected by operating the joystick 34. In addition, the ordinary watercraft maneuvering mode is selected by operating the remote control lever 32.

In a preferred embodiment of the present invention, the watercraft maneuvering mode division information is recorded to divide the track data according to the classification of the watercraft maneuvering modes. More specifically, section information (mode section information) for the selected watercraft maneuvering mode is recorded as the watercraft maneuvering mode division information depending on the selecting operation/cancelling operation of the watercraft maneuvering mode. With one of the watercraft maneuvering modes being selected, an operation such that the one watercraft maneuvering mode is switched to another of the watercraft maneuvering modes is a cancelling operation for the one watercraft maneuvering mode and a selecting operation for the another watercraft maneuvering mode. The watercraft maneuvering mode section information includes one or both of information of the position and/or the time of the start of the section and information of the position and/or the time of the end of the section.

The watercraft track is displayed in a divided manner according to the classification of the watercraft maneuvering modes based on the track data and the mode section information on the display device 22. Therefore, the user is able to detect the watercraft track divided according to the classification of the watercraft maneuvering modes. In addition, the user selects the watercraft maneuvering mode so that the watercraft track is displayed in a divided and easily identifiable manner in association with the user's operation. Therefore, the user is able to detect the watercraft track divided in association with the user's memory. Thus, the watercraft track is conveniently displayed in a properly divided manner.

In a preferred embodiment of the present invention, the track display data generating unit 206 generates the track display data to display the watercraft track with the display attribute which varies according to the classification of the watercraft maneuvering modes. In a preferred embodiment of the present invention, more specifically, the user is able to set values of the display attribute based on the watercraft maneuvering mode. In a preferred embodiment of the present invention, the display attribute to be set includes the display color and/or the display line type which are used to display the watercraft track. With this arrangement, the watercraft track can be displayed with different display attribute values (in different display colors and/or different display line types) set by the user based on the watercraft maneuvering mode on the display device 22. Therefore, the watercraft track is able to be displayed in a divided manner based on the watercraft maneuvering mode that is easily identifiable manner.

In a preferred embodiment of the present invention, the display/non-display of the watercraft track is specified based on the watercraft maneuvering mode by operating the touch panel 23, and the watercraft track is displayed on the display device 22 according to the specification. Thus, the watercraft track to be displayed is limited so that the watercraft track is displayed in an easily identifiable manner.

In a preferred embodiment of the present invention, the deletion/retention of the track data is specified based on the watercraft maneuvering mode by operating the touch panel 23, and the track data in the memory 21M is edited according to the specification. Thus, the watercraft track to be displayed on the display device 22 is limited by retaining only the necessary track data so that the watercraft track is displayed in an easily identifiable manner.

In a preferred embodiment of the present invention, the checkpoints are able to be set by utilizing the previous track data, and the watercraft is able be automatically maneuvered along the target course passing through the checkpoints in the checkpoint following mode. Since the watercraft is thus automatically maneuvered by utilizing the previous track data, the watercraft maneuvering control apparatus 20 is highly convenient.

In a preferred embodiment of the present invention, in addition, the reference watercraft track screen is displayed on which the previous watercraft track is displayed, and the watercraft track section to be referred to for setting the checkpoints is specified on the screen in the checkpoint following mode. The watercraft track section is a section provided by dividing the watercraft track according to the classification of the watercraft maneuvering modes and, therefore, the user is able to properly select the watercraft track section based on the user's memory. This makes it easier to specify the track data to be utilized to set the target course. Thus, the watercraft maneuvering control apparatus 20 is more convenient.

In a preferred embodiment of the present invention, the controller 21 functions to export and import the track data and the watercraft maneuvering mode division information (mode section information). The track data and the watercraft maneuvering mode division information are able to be utilized in a different watercraft through the export thereof. On the other hand, the track data and the watercraft maneuvering mode division information exported by the watercraft maneuvering control apparatus 20 of a different watercraft are able to be utilized through the import thereof. Thus, the useful track data is able to be utilized, and the track data is able to be divided based on the watercraft maneuvering mode division information such that the track data is utilized in a highly conveniently manner. For example, specific track data and specific watercraft maneuvering mode division information can be shared to be analyzed by a plurality of users.

While preferred embodiments of the present invention have thus been described, the present invention may be embodied in other ways.

In a preferred embodiment of the present invention described above, the watercraft maneuvering mode division information is recorded by recording the section information including at least one of the information of the start position/start time of the watercraft maneuvering mode and the information of the end position/end time of the watercraft maneuvering mode. The watercraft maneuvering mode division information may be practically recorded by recording the section information and, in addition, classifying and recording the track data based on the watercraft maneuvering mode. The track data may be stored, for example, in folders based on the watercraft maneuvering mode. By thus classifying and recording the track data based on the watercraft maneuvering mode, the track data is divided based on the watercraft maneuvering mode such that the track display data is generated in a divided manner according to the classification of the watercraft maneuvering modes.

In a preferred embodiment of the present invention described above, the display/non-display of the watercraft track may be specified based on the watercraft maneuvering mode by way of specific example, but the display/non-display of the watercraft track may be specified based on watercraft maneuvering mode categories which are broader than the individual watercraft maneuvering modes. As described with reference to FIG. 6, for example, the watercraft maneuvering modes may be classified into three broader-category watercraft maneuvering modes, i.e., the ordinary watercraft maneuvering mode, the course holding system mode, and the position/azimuth holding system mode, and the display/non-display of the watercraft track may be specified according to the classification of the broader-category watercraft maneuvering modes.

In a preferred embodiment of the present invention described above, similarly, the deletion/retention of the track data may be specified based on the watercraft maneuvering mode by way of specific example, but the deletion/retention of the track data may be specified based on watercraft maneuvering mode categories which are broader than the individual watercraft maneuvering modes. As described with reference to FIG. 6, for example, the watercraft maneuvering modes may be classified into three broader-category watercraft maneuvering modes, i.e., the ordinary watercraft maneuvering mode, the course holding system mode, and the position/azimuth holding system mode, and the deletion/retention of the track data may be specified according to the classification of the broader-category watercraft maneuvering modes.

In a preferred embodiment of the present invention described above, the watercraft track is displayed in a divided manner according to the classification of the individual watercraft maneuvering modes in the first example (see FIGS. 5A to 5C), and the watercraft track is displayed in a divided manner according to the classification of the three broader-category watercraft maneuvering modes including the ordinary watercraft maneuvering mode, the course holding system mode, and the position/azimuth holding system mode in the second example (see FIG. 6). Of course, the watercraft maneuvering modes may be classified in any other way for the divided display of the watercraft track. In a preferred embodiment of the present invention described above, the watercraft maneuvering modes are provided by way of example, and may include any other watercraft maneuvering modes.

In a preferred embodiment of the present invention described above, the single controller 21 functions as the propulsion device controller 201 and the display controller 202 (track display controller 203), but controllers respectively including the functions as the propulsion device controller 201 and the display controller 202 may be provided separately.

In the above-described preferred embodiments, the description is mainly directed to an exemplary case in which the outboard motor is used as the propulsion device, but other types of propulsion devices may be used. Examples of the other types of propulsion devices to be used include an inboard/outboard motor (stern drive or inboard motor/outboard drive), an inboard motor, and a waterjet drive.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft maneuvering control apparatus for controlling a propulsion device of a watercraft in a plurality of watercraft maneuvering modes, the watercraft maneuvering control apparatus comprising:
 a position detector to detect a position of the watercraft;
 a watercraft maneuvering mode selector operable by a user to select one of the watercraft maneuvering modes;
 a propulsion device controller configured or programmed to control the propulsion device in the watercraft maneuvering mode selected by the watercraft maneuvering mode selector;
 a track display controller to generate track display data to display a track of the watercraft; and
 a display to display the watercraft track based on the track display data generated by the track display controller;
 wherein the track display controller is configured or programmed to function as:

a track data recorder to record track data by recording the watercraft position detected by the position detector in accordance with time;

a watercraft maneuvering mode division information recorder to record watercraft maneuvering mode division information to divide the track data based on a watercraft maneuvering mode as selected by the watercraft maneuvering mode selector; and a track display data generator to generate the track display data to display the watercraft track divided according to classification of the watercraft maneuvering modes based on the track data recorded by the track data recorder and the watercraft maneuvering mode division information recorded by the watercraft maneuvering mode division information recorder.

2. The watercraft maneuvering control apparatus according to claim 1, wherein the watercraft maneuvering mode division information recorder includes a mode section information recorder to record section information for the selected watercraft maneuvering mode as the watercraft maneuvering mode division information according to the selection of the watercraft maneuvering mode by the watercraft maneuvering mode selector.

3. The watercraft maneuvering control apparatus according to claim 1, wherein the track display data generator is configured or programmed to generate the track display data to display the watercraft track with a display attribute which varies according to the classification of the watercraft maneuvering modes.

4. The watercraft maneuvering control apparatus according to claim 3, wherein the display attribute includes at least one of a display color and a display line type.

5. The watercraft maneuvering control apparatus according to claim 3, further comprising:

a display attribute setter operable by the user to set the display attribute based on the watercraft maneuvering mode; wherein the track display data generator is configured or programmed to generate the track display data according to the display attribute set by the display attribute setter.

6. The watercraft maneuvering control apparatus according to claim 1, further comprising:

a non-display watercraft maneuvering mode specifier operable by the user to specify a non-display watercraft maneuvering mode for which the watercraft track is not to be displayed; wherein the track display data generator is configured or programmed to generate track display data to allow display of the watercraft track for a watercraft maneuvering mode unspecified by the non-display watercraft maneuvering mode specifier, and does not allow display of the watercraft track for the non-display watercraft maneuvering mode specified by the non-display watercraft maneuvering mode specifier.

7. The watercraft maneuvering control apparatus according to claim 1, further comprising:

a deletion watercraft maneuvering mode specifier operable by the user to specify a deletion watercraft maneuvering mode for which the track data is to be deleted; wherein the track display controller is configured or programmed to function as a track data editor to delete the track data for the deletion watercraft maneuvering mode specified by the deletion watercraft maneuvering mode specifier.

8. The watercraft maneuvering control apparatus according to claim 1, further comprising a target course setter operable by the user to set a target course based on track data previously recorded by the track data recorder; wherein the watercraft maneuvering modes include a course follow-up automatic watercraft maneuvering mode in which the propulsion device is controlled to follow the target course set by the target course setter.

9. The watercraft maneuvering control apparatus according to claim 8, wherein the target course setter includes a watercraft track section specifier operable by the user to specify a section of the previous watercraft track on the display according to the division based on the watercraft maneuvering mode division information recorded by the watercraft maneuvering mode division information recorder, and to set the target course based on the watercraft track section specified by the watercraft track section specifier.

10. The watercraft maneuvering control apparatus according to claim 1, wherein the track display controller is configured or programmed to function to export the track data and the watercraft maneuvering mode division information.

11. The watercraft maneuvering control apparatus according to claim 1, wherein the track display controller is configured or programmed to function to import the track data and the watercraft maneuvering mode division information.

12. A watercraft maneuvering system comprising:

a propulsion device; and a watercraft maneuvering control apparatus to control the propulsion device in a plurality of watercraft maneuvering modes, the watercraft maneuvering control apparatus including:

a position detector to detect a position of the watercraft;

a watercraft maneuvering mode selector operable by a user to select one of the watercraft maneuvering modes;

a propulsion device controller configured or programmed to control the propulsion device in the watercraft maneuvering mode selected by the watercraft maneuvering mode selector;

a track display controller to generate track display data to display a track of the watercraft; and a display to display the watercraft track based on the track display data generated by the track display controller; wherein the track display controller is configured or programmed to function as:

a track data recorder to record track data by recording the watercraft position detected by the position detector in accordance with time;

a watercraft maneuvering mode division information recorder to record watercraft maneuvering mode division information to divide the track data based on a watercraft maneuvering mode as selected by the watercraft maneuvering mode selector; and a track display data generator to generate the track display data to display the watercraft track divided according to classification of the watercraft maneuvering modes based on the track data recorded by the track data recorder and the watercraft maneuvering mode division information recorded by the watercraft maneuvering mode division information recorder.

* * * * *